United States Patent
Choi et al.

(10) Patent No.: US 12,260,051 B2
(45) Date of Patent: Mar. 25, 2025

(54) ELECTRONIC DEVICE HAVING CENTRAL ELECTRODES AND PERIPHERAL ELECTRODES AND AT LEAST ONE ELECTRODE OF A PLURALITY OF ELECTRODES INTERPOSED THEREBETWEEN

(71) Applicant: SAMSUNG DISPLAY CO., LTD., Yongin-si (KR)

(72) Inventors: Jaeuk Choi, Yongin-si (KR); Yun-Ho Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/331,435

(22) Filed: Jun. 8, 2023

(65) Prior Publication Data

US 2024/0103671 A1   Mar. 28, 2024

(30) Foreign Application Priority Data

Sep. 27, 2022   (KR) .................. 10-2022-0122397

(51) Int. Cl.
G06F 3/044   (2006.01)

(52) U.S. Cl.
CPC .. *G06F 3/0443* (2019.05); *G06F 2203/04111* (2013.01)

(58) Field of Classification Search
CPC ......... G06F 3/0443; G06F 2203/04111; G06F 3/041662; G06F 3/0446; G06F 3/047; G06F 3/0416; B32B 15/14
See application file for complete search history.

(56) References Cited

U.S. PATENT DOCUMENTS

| | | | |
|---|---|---|---|
| 9,552,068 B2 | 1/2017 | Aubauer et al. | |
| 9,921,739 B2 | 3/2018 | Dorfner | |
| 10,126,883 B2 | 11/2018 | Coulson et al. | |
| 10,362,976 B2 | 7/2019 | Aubauer | |
| 10,656,742 B2 | 5/2020 | Kim et al. | |
| 2013/0257786 A1* | 10/2013 | Brown | G06F 3/0443 345/174 |
| 2014/0238730 A1* | 8/2014 | Nakamura | B32B 15/14 174/253 |
| 2014/0313434 A1* | 10/2014 | Kim | G06F 3/0446 349/12 |

(Continued)

FOREIGN PATENT DOCUMENTS

| | | |
|---|---|---|
| KR | 10-2018-0090936 | 8/2018 |
| KR | 10-2137687 | 7/2020 |
| KR | 10-2234990 | 4/2021 |

*Primary Examiner* — Richard J Hong
(74) *Attorney, Agent, or Firm* — F. CHAU & ASSOCIATES, LLC

(57) ABSTRACT

An electronic device includes a first sensing group that includes a plurality of first electrodes arranged in a first direction and a plurality of second electrodes arranged in a second direction that crosses the first direction, and a second sensing group that includes a central electrode and a plurality of peripheral electrodes disposed in a plurality of openings formed in some of the plurality of first electrodes. At least one first electrode of the plurality of first electrodes or at least one second electrode of the plurality of second electrodes is interposed between the central electrode and each of the plurality of peripheral electrodes.

19 Claims, 23 Drawing Sheets

(56) References Cited

U.S. PATENT DOCUMENTS

| | | | |
|---|---|---|---|
| 2015/0015532 A1* | 1/2015 | Choung | G06F 3/0446 345/174 |
| 2015/0160754 A1* | 6/2015 | Wenzel | G06F 3/041662 345/174 |
| 2016/0048248 A1* | 2/2016 | Na | G06F 3/047 345/174 |
| 2020/0089369 A1* | 3/2020 | Bang | G06F 3/0416 |

* cited by examiner

ELECTRONIC DEVICE HAVING CENTRAL ELECTRODES AND PERIPHERAL ELECTRODES AND AT LEAST ONE ELECTRODE OF A PLURALITY OF ELECTRODES INTERPOSED THEREBETWEEN

CROSS-REFERENCE TO RELATED APPLICATIONS

This application claims priority under 35 U.S.C. § 119 from Korean Patent Application No. 10-2022-0122397, filed on Sep. 27, 2022 in the Korean Intellectual Property Office, the contents of which are herein incorporated by reference in their entirety.

TECHNICAL FIELD

Embodiments of the present disclosure described herein are directed to an electronic device that senses coordinates and gestures from an external input.

DISCUSSION OF THE RELATED ART

Multimedia electronic devices, such as televisions (TV), cellular phones tablet computers, navigation systems, and game consoles, include an electronic device that displays an image. Electronic devices may also include an input sensor that provides a touch-based input device that enables a user to intuitively, conveniently, and easily input information or a command, in addition to a general input device, such as a button, a keyboard, or a mouse.

SUMMARY

Embodiments of the present disclosure are directed to an electronic device that senses coordinates and gestures from an external input.

According to an embodiment, an electronic device includes a first sensing group that includes a plurality of first electrodes arranged in a first direction and a plurality of second electrodes arranged in a second direction that crosses the first direction, and a second sensing group that includes a central electrode and a plurality of peripheral electrodes disposed in a plurality of openings formed in some of the plurality of first electrodes. At least one first electrode of the plurality of first electrodes or at least one second electrode of the plurality of second electrodes is interposed between the central electrode and each of the plurality of peripheral electrodes.

No openings may be formed in the at least one first electrode.

The plurality of peripheral electrodes may include a first peripheral electrode, a second peripheral electrode, a third peripheral electrode, and a fourth peripheral electrode spaced apart from each other. The first peripheral electrode and the second peripheral electrode are spaced apart from each other in the first direction with the central electrode interposed between the first peripheral electrode and the second peripheral electrode, and the third peripheral electrode and the fourth peripheral electrode are spaced apart from each other in the second direction with the central electrode interposed between the third peripheral electrode and the fourth peripheral electrode.

The central electrode includes a plurality of central patterns arranged in the first direction, in which each of the plurality of central patterns extends in the second direction, and a central bridge pattern that electrically connects the plurality of central patterns to each other.

The electronic device may further include a central trace line electrically connected to the central electrode. A line opening is formed in one first electrode of the plurality of first electrodes, and the central trace line overlaps the line opening.

The first peripheral electrode includes a plurality of first peripheral patterns arranged in the first direction, in which each of the plurality of first peripheral patterns extends in the second direction, and a first peripheral bridge pattern that electrically connects the plurality of first peripheral patterns to each other. The second peripheral electrode may include a plurality of second peripheral patterns arranged in the first direction, in which each of the plurality of second peripheral patterns extends in the second direction, and a second peripheral bridge pattern that electrically connects the plurality of second peripheral patterns to each other. The number of the plurality of first peripheral patterns may be equal to the number of the plurality of second peripheral patterns.

A first length in the second direction of each of the plurality of central patterns may be substantially equal to a second length in the second direction of each of the plurality of first peripheral patterns and a third length in the second direction of each of the plurality of second peripheral patterns.

The third peripheral electrode may include a plurality of third peripheral patterns arranged in the first direction, in which each of the plurality of third peripheral patterns extends in the second direction, and a third peripheral bridge pattern that electrically connects the plurality of third peripheral patterns to each other. The fourth peripheral electrode may include a plurality of fourth peripheral patterns arranged in the first direction. Each of the plurality of fourth peripheral patterns may extend in the second direction, and a number of the plurality of third peripheral patterns may be equal to a number of the plurality of fourth peripheral patterns.

The number of the plurality of third peripheral patterns and the number of the plurality of fourth peripheral patterns may be equal to a number of the plurality of central patterns.

The electronic device may further include a connection trace portion that electrically connects the plurality of fourth peripheral patterns to each other.

The electronic device may further include a plurality of pads electrically connected to the first sensing group and the second sensing group, in which the fourth peripheral electrode is spaced apart from the plurality of pads with the third peripheral electrode interposed between the fourth peripheral electrode and the plurality of pads.

The electronic device may further include a plurality of first trace lines electrically connected to the plurality of first electrodes, respectively, a plurality of second trace lines electrically connected to the plurality of second electrodes, respectively, a central trace line electrically connected to the central electrode, a first peripheral trace line electrically connected to the first peripheral electrode, a second peripheral trace line electrically connected to the second peripheral electrode, a third peripheral trace line electrically connected to the third peripheral electrode, and a fourth peripheral trace line electrically connected to the fourth peripheral electrode.

Some first trace lines of the plurality of first trace lines may be interposed between the third peripheral trace line and the central trace line, other first trace lines of the plurality of first trace lines and some second trace lines of the plurality of second trace lines may be interposed between the central trace line and the second peripheral trace line, other second trace lines of the plurality of second trace lines may be interposed between the second peripheral trace line and the fourth peripheral trace line, and still other first trace lines of the plurality of first trace lines may be disposed between the first peripheral trace line and the third peripheral trace line.

Coordinates of an external input may be sensed by the first sensing group, and a gesture is sensed by the second sensing group.

According to an embodiment, an electronic device may include a plurality of first electrodes arranged in a first direction, a plurality of second electrodes arranged in a second direction that crosses the first direction, a central pattern that extends in the second direction, a first peripheral pattern that extends in the second direction, a second peripheral pattern that extends in the second direction, a third peripheral pattern that extends in the second direction, and a fourth peripheral pattern that extends in the second direction. The plurality of first electrodes may include a first-first electrode that includes a first opening formed in the first-first electrode, a first-second electrode that includes a second opening formed in the first-second electrode, and a first-third electrode that includes a third opening, a fourth opening, and a fifth opening spaced apart from each other in the second direction. The first peripheral pattern is disposed in the first opening, the second peripheral pattern is disposed in the second opening, the third peripheral pattern is disposed in the third opening, the central pattern is disposed in the fourth opening, and the fourth peripheral pattern is disposed in the fifth opening.

The first-first electrode, the first-third electrode, and the first-second electrode may be arranged in the first direction. The plurality of first electrodes may further include a first-fourth electrode interposed between the first-first electrode and the first-third electrode, and a first-fifth electrode interposed between the first-third electrode and the first-second electrode.

The electronic device may further include a central trace line electrically connected to the central pattern. A line opening may be formed in one of the first-fourth electrode and the first-fifth electrode, and the central trace line may be disposed in the line opening.

A first length in the second direction of the central pattern may be substantially equal to a second length in the second direction of the first peripheral pattern and a third length in the second direction of the second peripheral pattern.

The electronic device may further include a plurality of first trace lines electrically connected to the plurality of first electrodes, respectively, a plurality of second trace lines electrically connected to the plurality of second electrodes, respectively, a central trace line electrically connected to the central pattern, a first peripheral trace line electrically connected to the first peripheral pattern, a second peripheral trace line electrically connected to the second peripheral pattern, a third peripheral trace line electrically connected to the third peripheral pattern, and a fourth peripheral trace line electrically connected to the fourth peripheral pattern. Some first trace lines of the plurality of first trace lines may be interposed between the third peripheral trace line and the central trace line, other first trace lines of the plurality of first trace lines and some second trace lines of the plurality of second trace lines may be interposed between the central trace line and the second peripheral trace line, other second trace lines of the plurality of second trace lines may be interposed between the second peripheral trace line and the fourth peripheral trace line, and still other first trace lines of the plurality of first trace lines may be interposed between the first peripheral trace line and the third peripheral trace line.

The electronic device may further include a plurality of pads connected to the plurality of first trace lines, the plurality of second trace lines, the central trace line, the first peripheral trace line, the second peripheral trace line, the third peripheral trace line, and the fourth peripheral trace line, and a connection trace portion disposed between the fourth peripheral pattern and the fourth peripheral trace line. A plurality of the fourth peripheral patterns may be provided. The plurality of fourth peripheral patterns may be electrically connected to each other by the connection trace portion. The plurality of fourth peripheral patterns may be spaced apart from the plurality of pads with the third peripheral pattern interposed between the fourth peripheral patterns and the plurality of pads.

DETAILED DESCRIPTION

Figure 1:
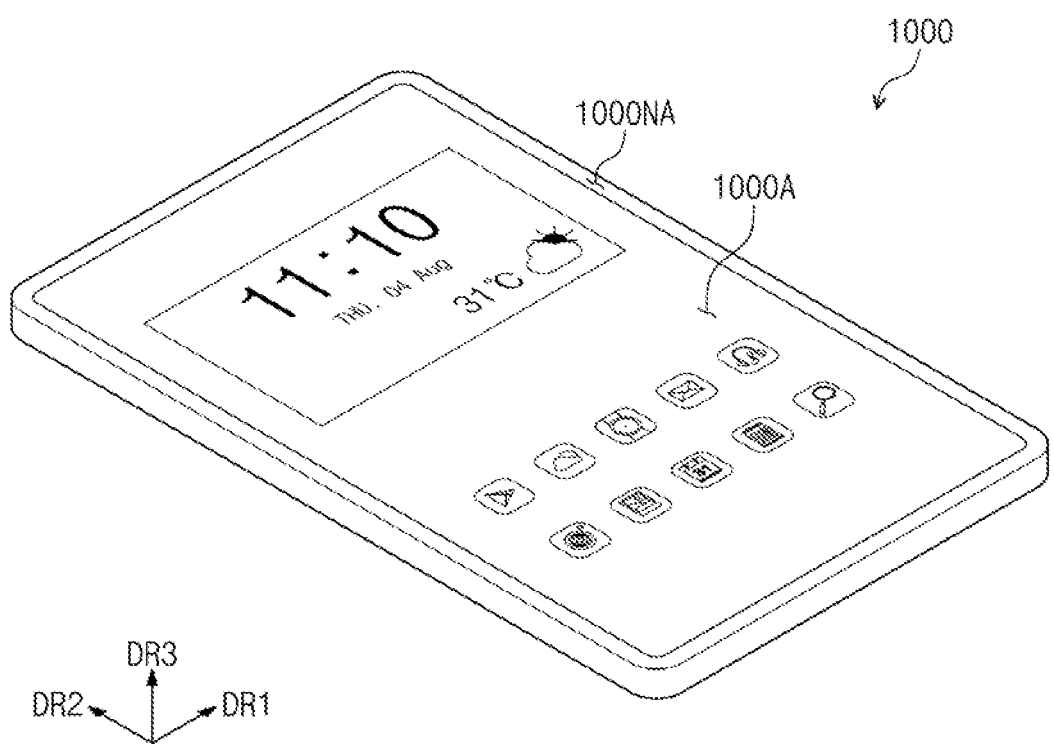
FIG. 1 is a perspective view of an electronic device according to an embodiment of the present disclosure.

In the specification, the expression that a first component (or region, layer, part, portion, etc.) is "on", "connected with", or "coupled to" a second component means that the first component is directly on, connected with, or coupled to the second component or means that a third component is disposed therebetween.

In the drawings, the same reference numeral may refer to the same component.

Hereinafter, embodiments of the present disclosure will be described with reference to accompanying drawings.

FIG. 1 is a perspective view of an electronic device 1000, according to an embodiment of the present disclosure.

Referring to FIG. 1, in an embodiment, the electronic device 1000 is activated in response to an electrical signal. For example, the electronic device 1000 may be one of a cellular phone, a laptop computer, a television, a tablet, a vehicle navigation system, a game console, or a wearable device, but is not necessarily limited thereto. FIG. 1 illustrates that the electronic device 1000 is a tablet PC.

The electronic device 1000 includes an active region 1000A and a peripheral region 1000NA. The electronic device 1000 displays an image through the active region 1000A. The active region 1000A includes a surface that is parallel to a plane defined by a first direction DR1 and a second direction DR2. The peripheral region 1000NA surrounds the active region 1000A.

The thickness direction of the electronic device 1000 is parallel to a third direction DR3 that crosses the first direction DR1 and the second direction DR2. Accordingly, front surfaces (or top surfaces) and rear surfaces (or bottom surfaces) of members of the electronic device 1000 are defined based on the third direction DR3.

Although FIG. 1 illustrates the bar-type electronic device 1000, embodiments of the disclosure are not necessarily limited thereto. For example, the following description is applicable to electronic devices according to other embodiments, such as a rollable electronic device 1000 or a slidable electronic device 1000.

Figure 2:
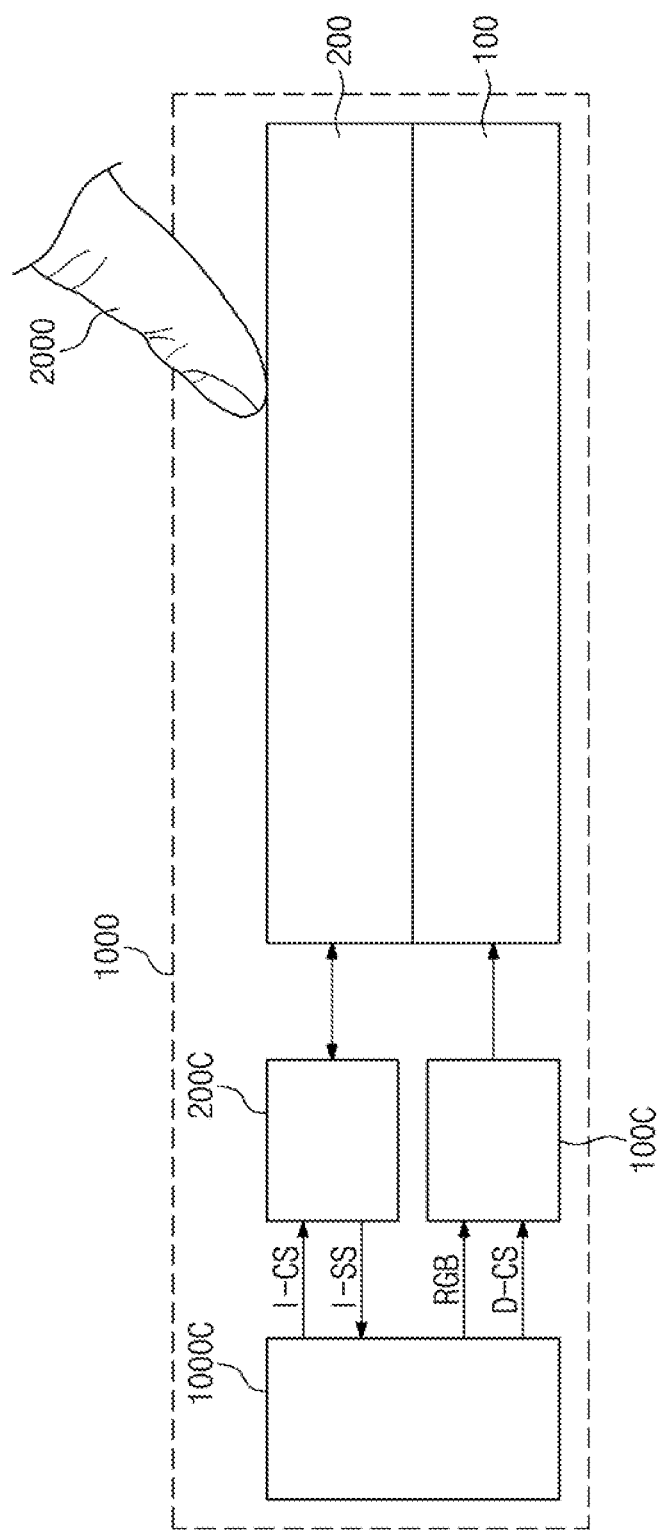
FIG. 2 illustrates an operation of an electronic device according to an embodiment of the present disclosure.

FIG. 2 illustrates an operation of the electronic device 1000 according to an embodiment of the present disclosure.

Referring to FIG. 2, in an embodiment, the electronic device 1000 includes a display layer 100, a sensor layer 200, a display driving unit 100C, a sensor driving unit 200C, and a main driving unit 1000C.

The display layer 100 generates an image. The display layer 100 is a light emitting display layer. For example, the display layer 100 is one of an organic light emitting display layer, an inorganic light emitting display layer, an organic-inorganic display layer, a quantum dot display layer, a micro-LED display layer, or a nano-LED display layer.

The sensor layer 200 is disposed on the display layer 100. The sensor layer 200 can sense an externally applied input 2000. The external input 2000 includes all inputs that can change a capacitance. For example, the sensor layer 200 can sense an input made by an active-type input unit that provides a driving signal, as well as a passive-type input unit, such as a user's body.

The sensor layer 200 includes a first sensing group and a second sensing group. Coordinates from the external input 2000 are sensed by the first sensing group, and a gesture is sensed by the second sensing group. The details thereof will be described below.

The main driving unit 1000C controls an overall operation of the electronic device 1000. For example, the main driving unit 1000C controls the operations of the display driving unit 100C and the sensor driving unit 200C. The main driving unit 1000C includes at least one microprocessor, and may be referred to as a "host". The main driving unit 1000C may further include a graphics controller.

The display driving unit 100C controls the display layer 100. The display driving unit 100C receives image data RGB and a control signal D-CS from the main driving unit 1000C. The control signal D-CS includes various signals. For example, the control signal D-CS includes an input vertical synchronization signal, an input horizontal synchronization signal, a main clock, and a data enable signal. The display driving unit 100C generates a vertical synchronization signal and a horizontal synchronization signal that control a timing to provide a signal to the display layer 100, based on the control signal D-CS.

The sensor driving unit 200C controls the sensor layer 200. The sensor driving unit 200C receives a sensing control signal I-CS from the main driving unit 1000C. The control signal I-CS includes a mode determining signal that determines a driving mode of the sensor driving unit 200C, and a clock signal.

The sensor driving unit 200C calculates information on coordinates of a user input, based on a signal received from the sensor layer 200, and provides a signal I-SS that includes the coordinate information to the main driving unit 1000C. Alternatively, the sensor driving unit 200C senses a gesture, based on a signal received from the sensor layer 200, and provides the signal I-SS that includes information on the gesture to the main driving unit 1000C. The main driving unit 1000C executes an operation that corresponds to the user input, based on the signal I-SS. For example, the main driving unit 1000C operates the display driving unit 100C such that a new application image is displayed on the display layer 100, based on the signal I-SS.

According to an embodiment of the present disclosure, the sensor layer 200 senses coordinates (2D touch) from the external input 2000 and a gesture input (for example, a 3D touch). Accordingly, the 2D touch and the 3D touch can be sensed by one sensor driving unit 200c to control the sensor layer 200. However, embodiments are not necessarily limited thereto. For example, in other embodiments, a driving unit that senses the 2D touch and a driving unit that senses the 3D touch are separately provided.

Figure 3A:
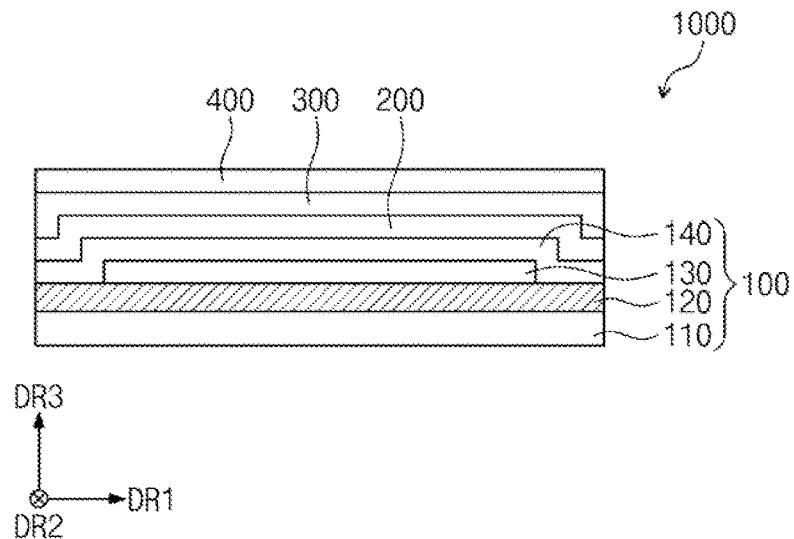
FIG. 3A is a cross-sectional view of an electronic device according to an embodiment of the present disclosure.

FIG. 3A is a cross-sectional view of the electronic device 1000, according to an embodiment of the present disclosure.

Referring to FIG. 3A, in an embodiment, the electronic device 1000 includes the display layer 100, the sensor layer 200, an anti-reflection layer 300, and a window 400.

The display layer 100 includes a base layer 110, a circuit layer 120, a light emitting device layer 130, and an encapsulation layer 140.

The base layer 110 provides a base surface for disposing the circuit layer 120. The base layer 110 is at least one of a glass substrate, a metal substrate, or a polymer substrate.

However, embodiments are not necessarily limited thereto, and in other embodiments, the base layer 110 is one of an inorganic layer, an organic layer, or a composite material layer.

The circuit layer 120 is disposed on the base layer 110. The circuit layer 120 includes an insulating layer, a semiconductor pattern, a conductive pattern, and a signal line. The insulating layer, the semiconductor layer, and the conductive layer are formed on the base layer 110 through a coating or deposition process. Thereafter, the insulating layer, the semiconductor layer, and the conductive layer are selectively patterned through multiple photolithography processes. Afterwards, the semiconductor pattern, the conductive pattern, and the signal line in the circuit layer 120 are formed.

The light emitting device layer 130 is disposed on the circuit layer 120. The light emitting device layer 130 includes a light emitting device. For example, the light emitting device layer 130 includes at least one of an organic light emitting material, an inorganic light emitting material, an organic-inorganic light emitting material, a quantum dot, a quantum rod, a micro-LED, or a nano-LED.

The encapsulation layer 140 is disposed on the light emitting device layer 130. The encapsulation layer 140 protects the light emitting device layer 130 from foreign substances such as moisture, oxygen, and dust particles.

The sensor layer 200 is disposed on the display layer 100. The sensor layer 200 is formed on the display layer 100 through a successive process. For example, the sensor layer 200 is directly disposed on the display layer 100. The wording "~directly disposed~" indicates that no third component is interposed between the sensor layer 200 and the display layer 100. For example, no additional adhesive member is interposed between the sensor layer 200 and the display layer 100. However, embodiments are not necessarily limited thereto, and in other embodiments, the sensor layer 200 is bonded to the display layer 100 through an adhesive member. The adhesive member includes at least one of a typical adhesive or a sticking agent.

The anti-reflection layer 300 is disposed on the sensor layer 200. The anti-reflection layer 300 reduces the reflectance of external light that is incident on the electronic device 1000. The anti-reflection layer 300 is directly disposed on the sensor layer 200. However, embodiments of the present disclosure are not necessarily limited thereto, and in other embodiments, an adhesive member is further interposed between the anti-reflection layer 300 and the sensor layer 200.

The window 400 is disposed on the anti-reflection layer 300. The window 400 includes an optically transparent material. For example, the window 400 includes one of glass or plastic. The window 400 may have a multi-layer structure or a single-layer structure. For example, the window 400 includes a plurality of plastic films coupled by an adhesive, or has a glass substrate and a plastic film coupled by an adhesive.

Figure 3B:
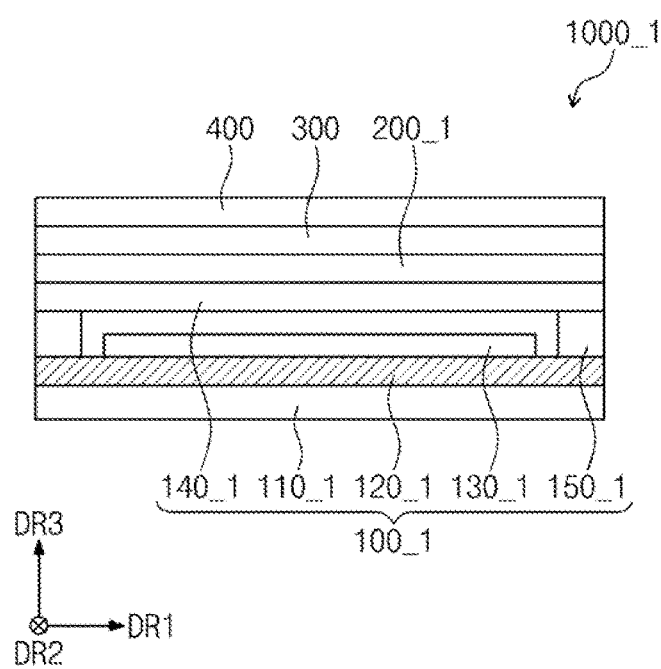
FIG. 3B is a cross-sectional view of an electronic device according to an embodiment of the present disclosure.

FIG. 3B is a cross-sectional view of an electronic device according to an embodiment of the present disclosure.

Referring to FIG. 3B, an electronic device 1000-1 includes a display layer 100_1, a sensor layer 200_1, the anti-reflection layer 300, and the window 400.

The display layer 100_1 includes a base substrate 110_1, a circuit layer 120_1, a light emitting device layer 130_1, an encapsulation substrate 140_1, and a coupling member 150_1.

Each of the base substrate 110_1 and the encapsulation substrate 140_1 includes at least one of a glass substrate, a metal substrate, or a polymer substrate, but is not necessarily limited thereto.

The coupling member 150_1 is interposed between the base substrate 110_1 and the encapsulation substrate 140_1. The coupling member 150_1 couples the encapsulation substrate 140_1 to the base substrate 110_1 or the circuit layer 120_1. The coupling member 150_1 may include an inorganic material or an organic material. For example, the inorganic material includes a frit seal, and the organic material includes a photo-curable resin or a photo-plastic resin. However, a material constituting the coupling member 150_1 is not necessarily limited to the above example.

The sensor layer 200_1 is directly disposed on the encapsulation substrate 140_1. For example, "directly disposed" means that no third component is interposed between the sensor layer 200_1 and the encapsulation substrate 140_1. For example, an separate adhesive member is interposed between the sensor layer 200_1 and the display layer 100_1. However, embodiments of the present disclosure are not necessarily limited thereto. For example, in some embodiments, an adhesive layer is further interposed between the sensor layer 200_1 and the encapsulation substrate 140_1.

Figure 4:
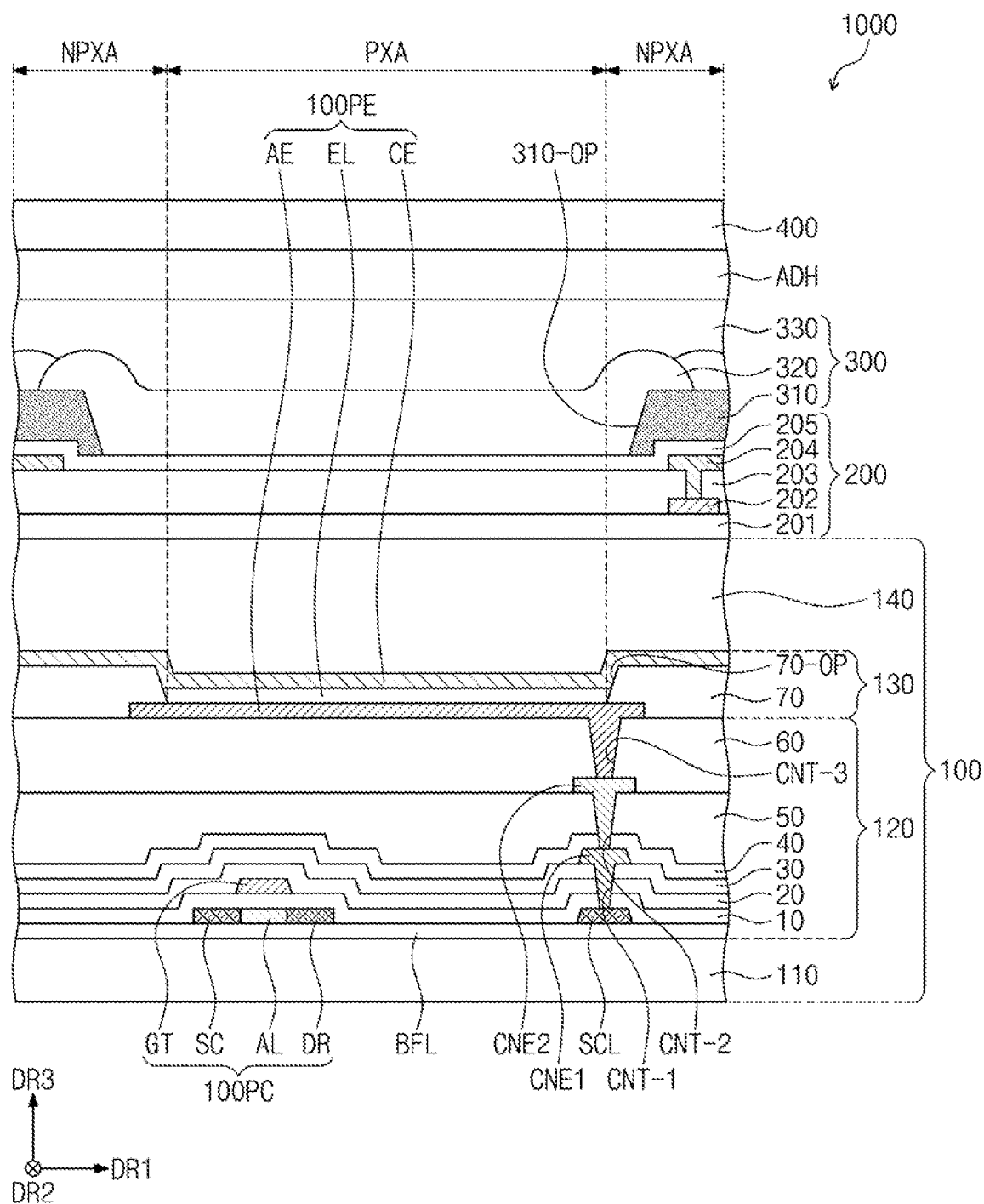
FIG. 4 is a cross-sectional view of an electronic device according to an embodiment of the present disclosure.

FIG. 4 is a cross-sectional view of the electronic device 1000, according to an embodiment of the present disclosure.

Referring to FIG. 4, in an embodiment, at least one inorganic layer is formed on a top surface of the base layer 110. The inorganic layer includes at least one of an aluminum oxide, a titanium oxide, a silicon oxide, a silicon nitride, a silicon oxynitride, a zirconium oxide, or a hafnium oxide. The inorganic layer has a multiple-layer structure. Multiple inorganic layers form a barrier layer and/or a buffer layer. According to an embodiment, the display layer 100 is illustrated as including a buffer layer BFL.

The buffer layer BFL improves a bonding force between the base layer 110 and a semiconductor pattern. The buffer layer BFL includes at least one of silicon oxide, silicon nitride, or silicon oxynitride. For example, the buffer layer BFL has a structure in which a silicon oxide layer and a silicon nitride layer are alternately stacked.

The semiconductor pattern is disposed on the buffer layer BFL. For example, the semiconductor pattern includes polysilicon. However, embodiments of the present disclosure are not necessarily limited thereto, and in other embodiments, the semiconductor pattern includes one of amorphous silicon, low-temperature polycrystalline silicon, or oxide semiconductor.

FIG. 4 illustrates a portion of the semiconductor pattern, and the semiconductor pattern may be further disposed in another region. Semiconductor patterns are arranged across pixels according to a specific rule. The semiconductor patterns has a different electrical properties, depending on whether the patterns are doped. The semiconductor patterns include a first region that has higher conductivity and a second region that has lower conductivity. The first region may be doped with N-type dopants or P-type dopants. A P-type transistor includes a doping region doped with a P-type dopant, and an N-type transistor includes a doping region doped with an N-type dopant. The second region may be a non-doping region or a region doped at a concentration lower than the concentration of the first region.

The conductivity of the first region is greater than the conductivity of the second region, and the first region substantially serves as an electrode or a signal line. The second region corresponds to an active region (or channel) of a transistor. For example, a portion of the semiconductor pattern is an active region of a transistor, another portion of the semiconductor pattern is a source or a drain of the transistor, and still another portion of the semiconductor pattern is a connection electrode or a connection signal line.

Each of pixels can be expressed by an equivalent circuit that includes seven transistors, one capacitor, and a light emitting device, and the equivalent circuit of the pixel can be modified into various forms. One transistor 100PC and one light emitting device 100PE of the pixel are illustrated in FIG. 4 by way of example.

A source region SC, an active region AL, and a drain region DR of the transistor 100PC are formed from the semiconductor pattern. The source region SC and the drain region DR extend in opposite directions from the active region AL, when viewed in a cross-sectional view. A portion of a connection signal line SCL formed from the semiconductor pattern is illustrated in FIG. 4. In addition, the connection signal line SCL is connected to the drain region DR of the transistor 100PC, when viewed in a plan view.

A first insulating layer 10 is disposed on the buffer layer BFL. The first insulating layer 10 commonly overlaps the pixels and the first insulating layer 10 covers the semiconductor pattern. The first insulating layer 10 may be an inorganic layer and/or an organic layer, and may have a single-layer or multi-layer structure. The first insulating layer 10 includes at least one of an aluminum oxide, a titanium oxide, a silicon oxide, a silicon nitride, a silicon oxynitride, a zirconium oxide, or a hafnium oxide. According to an embodiment, the first insulating layer 10 is a single-layer silicon oxide layer. The insulating layer of the circuit layer 120, which is to be described below, in addition to the first insulating layer 10, is an inorganic layer and/or an organic layer, and has a single-layer structure or a multi-layer structure. The inorganic layer includes, but is not necessarily limited to, at least one of the above-described materials.

A gate GT of the transistor 100PC is disposed on the first insulating layer 10. The gate GT is a portion of a metal pattern. The gate GT overlaps the active region AL. The gate GT functions as a mask in a process of doping the semiconductor pattern.

A second insulating layer 20 is disposed on the first insulating layer 10 and covers the gate GT. The second insulating layer 20 commonly overlaps the pixels. The second insulating layer 20 may be an inorganic layer and/or an organic layer, and may have a single-layer structure or a multi-layer structure. The second insulating layer 20 includes at least one of silicon oxide, silicon nitride, or silicon oxynitride. According to an embodiment, the second insulating layer 20 has a multi-layer structure that includes a silicon oxide layer and a silicon nitride layer.

A third insulating layer 30 is disposed on the second insulating layer 20. The third insulating layer 30 may have a single-layer or multi-layer structure. For example, the third insulating layer 30 has a multi-layer structure that includes a silicon oxide layer and a silicon nitride layer.

A first connection electrode CNE1 is disposed on the third insulating layer 30. The first connection electrode CNE1 is connected to the connection signal line SCL through a contact hole CNT-1 formed through the first insulating layer 10, the second insulating layer 20, and the third insulating layer 30.

A fourth insulating layer 40 is disposed on the third insulating layer 30 and covers the first connection electrode CNE1. The fourth insulating layer 40 is a single silicon oxide layer. A fifth insulating layer 50 is disposed on the fourth insulating layer 40. The fifth insulating layer 50 is an organic layer.

A second connection electrode CNE2 is disposed on the fifth insulating layer 50. The second connection electrode CNE2 is connected to the first connection electrode CNE1 through a contact hole CNT-2 formed through the fourth insulating layer 40, and the fifth insulating layer 50.

A sixth insulating layer 60 is disposed on the fifth insulating layer 50 and covers the second connection electrode CNE2. The sixth insulating layer 60 is an organic layer.

The light emitting device layer 130 is disposed on the circuit layer 120. The light emitting device layer 130 includes the light emitting device 100PE. For example, the light emitting device layer 130 includes at least one of an organic light emitting material, an inorganic light emitting material, an organic-inorganic light emitting material, a quantum dot, a quantum rod, a micro-LED, or a nano-LED. The following description will be described assuming that the light emitting device 100PE is an organic light emitting device, by way of example, but embodiments of the present disclosure are not necessarily limited thereto.

The light emitting device 100PE includes a first electrode AE, a light emitting layer EL, and a second electrode CE.

The first electrode AE is disposed on the sixth insulating layer 60. The first electrode AE is connected with the second connection electrode CNE2 through a contact hole CNT-3 formed through the sixth insulating layer 60.

A pixel defining layer 70 is disposed on the sixth insulating layer 60 and covers a portion of the first electrode AE. An opening 70-OP is formed in the pixel defining layer 70. The opening 70-OP of the pixel defining layer 70 exposes at least a portion of the first electrode AE.

The active region 1000A (see FIG. 1) includes a light emitting region PXA and a non-light emitting region NPXA adjacent to the light emitting region PXA. The non-light emitting region NPXA surrounds the light emitting region PXA. According to an embodiment, the light emitting region PXA corresponds to the portion of the first electrode AE that is exposed by the opening 70-OP.

The light emitting layer EL is disposed on the first electrode AE. The light emitting layer EL is disposed in a region that corresponds to the opening 70-OP. For example, the light emitting layer EL is separately formed in each pixel. When the light emitting layer EL is separately formed in each pixel, each of the light emitting layers EL emits light of at least one of a blue color, a red color, or a green color. However, embodiments of the present disclosure are not necessarily limited thereto, and in other embodiments, the light emitting layer EL is connected with and commonly provided in the pixels. For example, the light emitting layer EL provides blue light or white light.

The second electrode CE is disposed on the light emitting layer EL. The second electrode CE is integrally formed and commonly disposed in the plurality of pixels.

In addition, a hole control layer is interposed between the first electrode AE and the light emitting layer EL. The hole control layer is commonly disposed in the light emitting region PXA and the non-light emitting region NPXA. The hole control layer includes a hole transport layer and may further include a hole injection layer. An electron control layer is interposed between the light emitting layer EL and the second electrode CE. The electron control layer includes an electron transport layer, and may further include an electron injection layer. The hole control layer and the electron control layer are commonly formed in the pixels by using an open mask or through an ink-jet process.

The encapsulation layer 140 is disposed on the light emitting device layer 130. The encapsulation layer 140 includes an inorganic layer, an organic layer, and an inorganic layer that are sequentially stacked, although layers of the encapsulation layer 140 are not necessarily limited thereto. The inorganic layers protect the light emitting device layer 130 from moisture and oxygen, and the organic layer protect the light emitting device layer 130 from foreign materials such as dust particles. The inorganic layers include at least one of a silicon nitride layer, a silicon oxynitride layer, a silicon oxide layer, a titanium oxide layer, or an aluminum oxide layer. The organic layer includes an acrylic-based organic layer, but embodiments of the present disclosure are not necessarily limited thereto.

The sensor layer 200 includes a base layer 201, a first conductive layer 202, a sensing insulating layer 203, a second conductive layer 204, and a cover insulating layer 205.

The base layer 201 is disposed on the encapsulation layer 140, and the first conductive layer 202 are disposed on the base layer. The sensing insulating layer 203 is disposed on the base layer 201 and covers the first conductive layer 202. The second conductive layer 204 is disposed on the sensing insulating layer 203 and is connected to the first conductive layer 202 through a hole formed through the sensing insulating layer 203. The cover insulating layer 205 is disposed on the sensing insulating layer 203 and covers the second conductive layer 204.

In an embodiment, the base layer 201 is an inorganic layer that includes at least one of silicon nitride, silicon oxynitride, or silicon oxide. In an embodiment, the base layer 201 is an organic layer that includes at least one of an epoxy resin, an acrylate resin, or an imide-based resin. The base layer 201 may have a single-layer structure or a multi-layer structure stacked in the third direction DR3.

Each of the first conductive layer 202 and the second conductive layer 204 may have a single-layer structure or a multi-layer structure stacked in the third direction DR3.

A conductive layer in a single-layer structure includes at least one of a metal layer or a transparent conductive layer. The metal layer includes at least one of molybdenum, silver, titanium, copper, aluminum, or an alloy thereof. The transparent conductive layer includes a transparent conductive oxide, such as one of indium tin oxide (ITO), indium zinc oxide (IZO), zinc oxide (ZnO), or indium zinc tin oxide (IZTO). In addition, the transparent conductive layer includes a conductive polymer, such as one of PEDOT, a metal nano-wire, or graphene.

A conductive layer in a multi-layer structure includes metal layers. The metal layers have, for example, a three-layer structure of titanium/aluminum/titanium. The conductive layer of a multi-layer structure includes at least one metal layer and at least one transparent conductive layer.

At least one of the sensing insulating layer 203 or the cover insulating layer 205 includes an inorganic film. The inorganic film includes at least one of an aluminum oxide, a titanium oxide, a silicon oxide, a silicon nitride, a silicon oxynitride, a zirconium oxide, or a hafnium oxide.

At least one of the sensing insulating layer 203 or the cover insulating layer 205 includes an organic film. The organic film includes at least one of an acrylate-based resin, a methacrylate-based resin, a polyisoprene, a vinyl-based resin, an epoxy-based resin, a urethane-based resin, a cellulose-based resin, a siloxane-based resin, a polyimide-based resin, a polyamide-based resin, or a perylene-based resin.

The anti-reflection layer 300 is disposed on the sensor layer 200. The anti-reflection layer 300 includes a partition layer 310, a plurality of color filters 320, and a planarization layer 330.

The partition layer 310 is disposed on and overlaps the second conductive layer 204. The cover insulating layer 205 is interposed between the partition layer 310 and the second conductive layer 204. According to an embodiment of the present disclosure, the cover insulating layer 205 is omitted.

The partition layer 310 prevents reflection of external light from the second conductive layer 204. A material of the partition layer 310 is not necessarily limited, as long as the material absorbs light. The partition layer 310 includes a layer that has a black color. According to an embodiment, the partition layer 310 includes a black coloring agent. The black coloring agent is one or more of a black dye or a black pigment. The black coloring agent includes a metal, such as carbon black or chromium, or an oxide thereof.

The partition layer 310 has a partition opening 310-*op* formed therein. The partition opening 310-*op* overlaps the light emitting layer EL and the opening 70-OP of the pixel defining layer 70. A color filter 320 is disposed that corresponds to the partition opening 310-*op*. The color filter 320 transmits light emitted from the light emitting layer EL that overlaps the color filter 320.

The planarization layer 330 covers the partition layer 310 and the color filter 320. The planarization layer 330 includes an organic material, and provides a flat top surface of the planarization layer 330. According to an embodiment, the planarization layer 330 is omitted.

According to an embodiment of the present disclosure, the anti-reflection layer 300 includes a reflection adjusting layer instead of the color filters 320. For example, as illustrated in FIG. 4, the color filters 320 are omitted and replaced with the reflection adjusting layer. The reflection adjusting layer selectively absorbs some wavelength bands of light reflected from the display panel and/or inside the electronic device, or external light incident on the display panel and/or the electronic device.

For example, in an embodiment, the reflection adjusting layer absorbs a first wavelength region of 490 nm to 505 nm and a second wavelength region of 585 nm to 600 nm, so that the light transmittance in the first wavelength region and the second wavelength region is 40% or less. The reflection adjusting layer may absorb light of wavelengths outside the wavelength range of red, green, and blue light emitted from the light emitting layer EL. As described above, the reflection adjusting layer absorbs light of wavelengths not in the red, green, or blue wavelength range emitted from the light emitting layer EL, thereby minimizing the reduction in brightness of the display panel and/or electronic device. In addition, simultaneously, the reduction of light emitting efficiency of the display panel and/or the electronic device is minimized, thereby increasing visibility.

The reflection adjusting layer is an organic material layer that includes at least one of a dye, a pigment, or a combination thereof. For example, the reflection adjusting layer include at least one of a tetraazaporphyrin (TAP)-based compound, a porphyrin-based compound, a metal porphyrin-based compound, an oxazine-based compound, a squarylium-based compound, a triarylmethane-based compound, a polymethine-based compound, an thraquinone-based compound, a phthalocyanine-based compound, an azo-based compound, a perylene-based compound, a xanthene-based compound, a dimmonium-based compound, a dipyrromethene-based compound, or a cyanine-based compound.

According to an embodiment, the reflection adjusting layer has a transmittance of about 64% to 72%. The transmittance of the reflection adjusting layer is adjusted depending on the content of the pigment and/or dye in the reflection adjusting layer.

The window 400 is disposed on the anti-reflection layer 300. An adhesive member ADH is interposed between the window 400 and the anti-reflection layer 300. However, embodiments of the present disclosure are not necessarily limited thereto, and in other embodiments, the window 400 is directly disposed on the anti-reflection layer 300. Alternatively, the window 400 may not be attached to the anti-reflective layer 300, and a gap may be defined between the window 400 and the anti-reflective layer 300.

Figure 5:
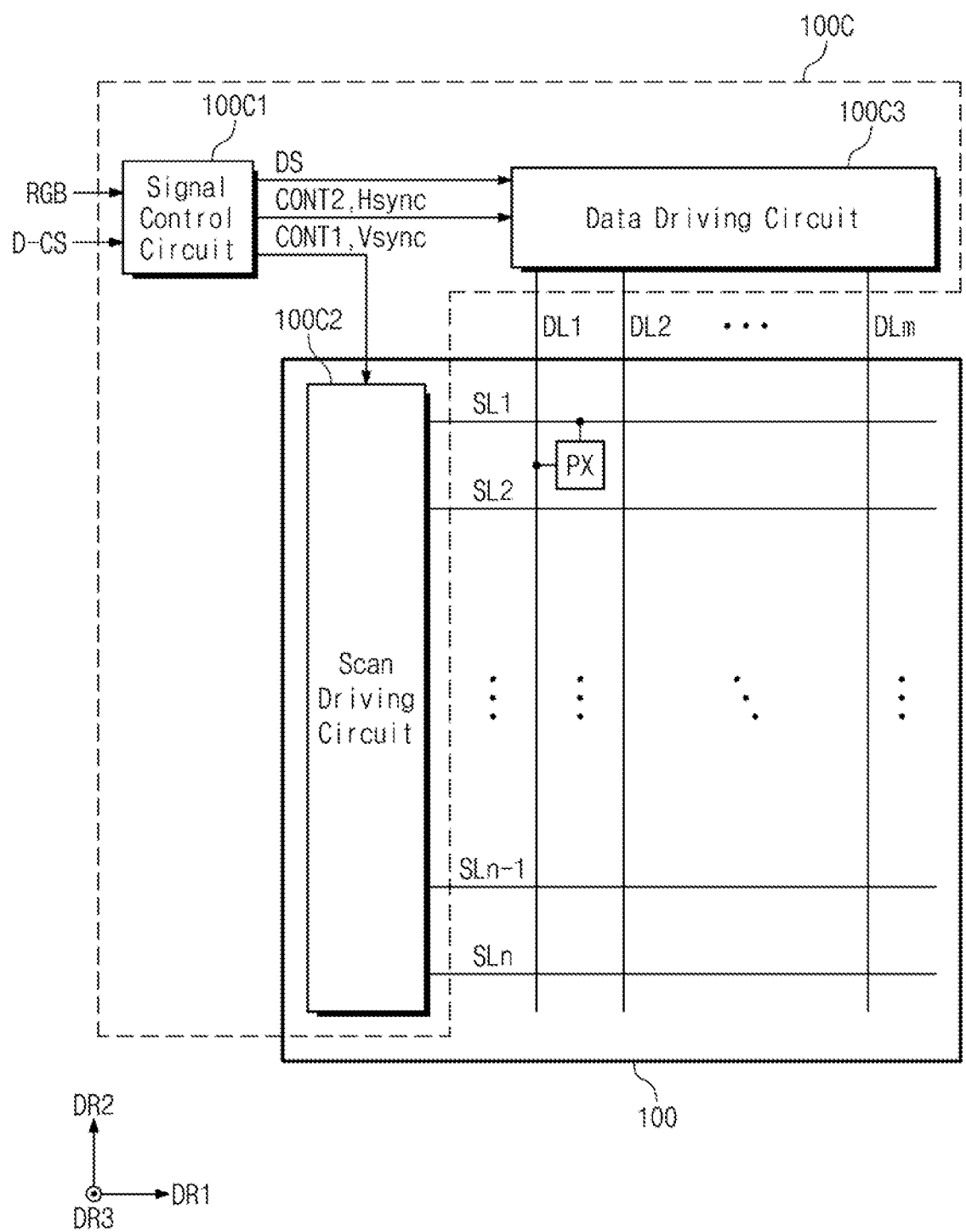
FIG. 5 is a block diagram of a display layer and a display driving unit according to an embodiment of the present disclosure.

FIG. 5 is a block diagram of the display layer 100 and the display driving unit 100C, according to an embodiment of the present disclosure.

Referring to FIG. 5, in an embodiment, the display layer 100 includes a plurality of scan lines SL1 to SLn, a plurality of data lines DL1 to DLm, where n and m are positive integers greater than one, and a plurality of pixels PX. Each of the plurality of pixels PX are connected with relevant data lines of the plurality of data lines DL1 to DLm and relevant scan lines of the plurality of scan lines SL1 to SLn. According to an embodiment of the present disclosure, the display layer 100 further includes light emitting control lines, and the display driving unit 100C further includes a light emitting driving circuit that provides control signals to the light emitting control lines. A configuration of the display layer 100 is not necessarily limited to that shown in FIG. 5.

Each of the plurality of scan lines SL1 to SLn extends in the first direction DR1, and the plurality of scan lines SL1 to SLn are spaced from each other in the second direction DR2. Each of the plurality of data lines DL1 to DLm extends in the second direction DR2, and the plurality of data lines DL1 to DLm are spaced from each other in the first direction DR1.

The display driving unit 100C includes a signal control circuit 100C1, a scan driving circuit 100C2, and a data driving circuit 100C3.

The signal control circuit 100C1 receives the image data RGB and the control signal D-CS from the main driving unit 1000C (see FIG. 2). The control signal D-CS includes various signals. For example, the control signal D-CS includes an input vertical synchronization signal, an input horizontal synchronization signal, a main clock, a data enable signal, etc.

The signal control circuit 100C1 generates a first control signal CONT1 and a vertical synchronization signal Vsync based on the control signal D-CS and outputs the first control signal CONT1 and the vertical synchronization signal Vsync to the scan driving circuit 100C2.

The signal control circuit 100C1 generates a second control signal CONT2 and a horizontal synchronization signal Hsync based on the control signal D-CS, and outputs the second control signal CONT2 and the horizontal synchronization signal Hsync to the data driving circuit 100C3.

In addition, the signal control circuit 100C1 outputs a driving signal DS to the data driving circuit 100C3. The driving signal DS is obtained by processing the image data RGB to be appropriate for an operating condition of the display layer 100. The first control signal CONT1 and the second control signal CONT2 are signals for operating the scan driving circuit 100C2 and the data driving circuit 100C3 and are not specifically limited.

The scan driving circuit 100C2 drives the plurality of scan lines SL1 to SLn in response to the first control signal CONT1 and the vertical synchronization signal Vsync. According to an embodiment of the present disclosure, the scan driving circuit 100C2 is formed in the same process as the circuit layer 120 (see FIG. 4) in the display layer 100, but embodiments of the present disclosure are not necessarily limited thereto. For example, in other embodiments, the scan driving circuit 100C2 is implemented in the form of an integrated circuit (IC) that is directly mounted in a specific region of the display layer 100, or mounted as a chip on film (COF) on a separate printed circuit board that is electrically connected to the display layer 100.

The data driving circuit 100C3 outputs a gray scale voltage to data lines DL1 to DLm in response to the second control signal CONT2, the horizontal synchronization signal Hsync, and the driving signal DS. The data driving circuit 100C3 is an integrated circuit that is directly mounted in a specific region of the display layer 100 or mounted on a separate printed circuit board as a chip on film, but embodiments of the present disclosure are not necessarily limited thereto. For example, in other embodiments, the data driving circuit 100C3 is formed in the same process as the circuit layer 120 (see FIG. 4) in the display layer 100.

Figure 6A:
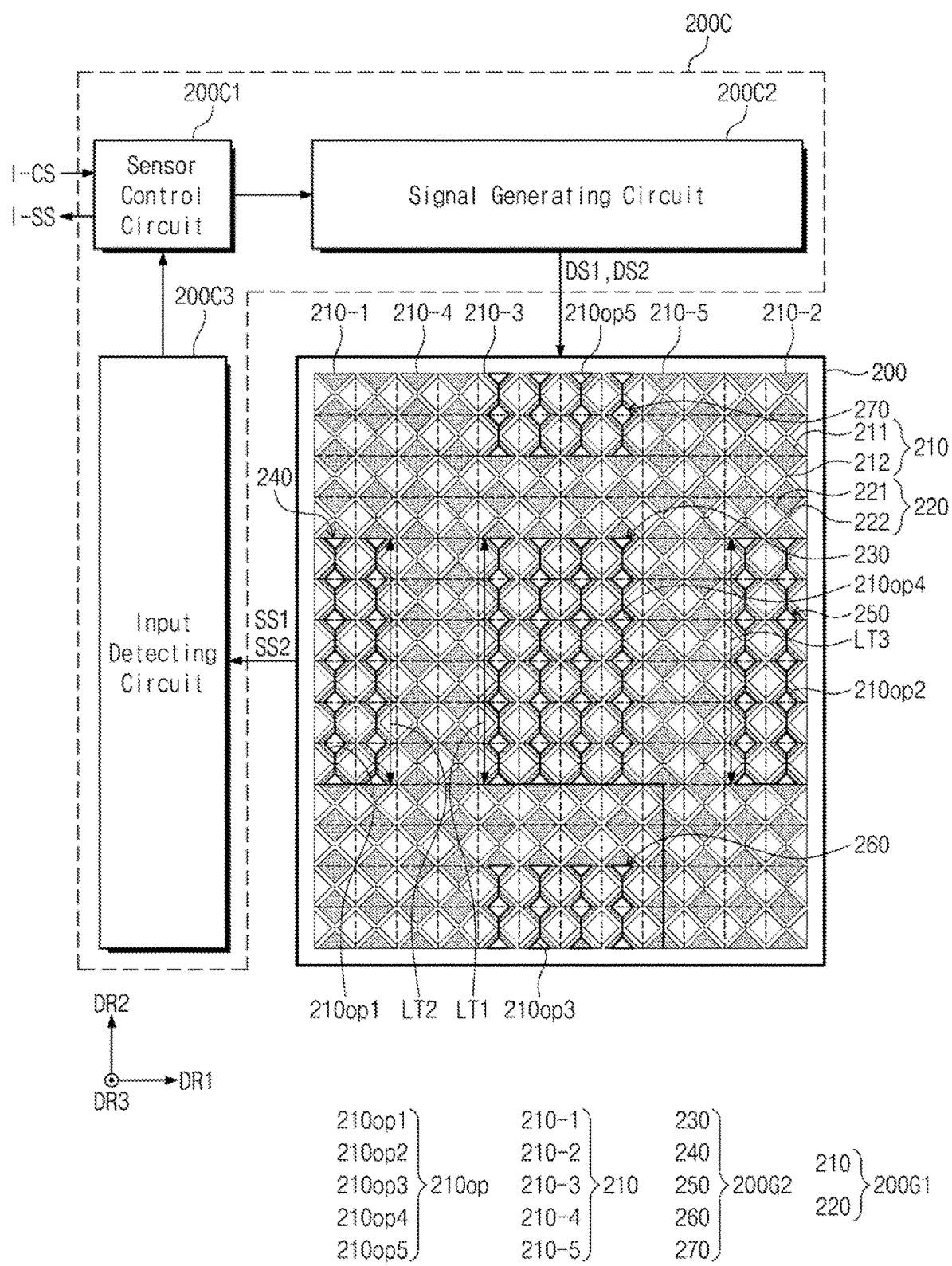
FIG. 6A is a block diagram of a sensor layer and a sensor driving unit according to an embodiment of the present disclosure.

FIG. 6A is a block diagram of the sensor layer 200 and the sensor driving unit 200C, according to an embodiment of the present disclosure.

Referring to FIG. 6A, in an embodiment, the sensor layer 200 includes a first sensing group 200G1 and a second sensing group 200G2. The coordinates from an external input are sensed by the first sensing group 200G1, and a gesture is sensed by the second sensing group 200G2. The first sensing group 200G1 and the second sensing group 200G2 overlap the active region 1000A (see FIG. 1). Accordingly, the electronic device 1000 (see FIG. 1) can sense a gesture without increasing an area of the peripheral region 1000NA (see FIG. 1).

The first sensing group 200G1 includes a plurality of first electrodes 210 and a plurality of second electrodes 220. The first electrodes 210 are arranged in the first direction DR1, and extend in the second direction DR2. The second electrodes 220 are arranged in the second direction DR2, and extend in the first direction DR1. The first electrodes 210 cross the second electrodes 220.

Each of the first electrodes 210 includes a first part 211 and a second part 212. The first part 211 and the second part 212 have an integrated form, and are disposed in the same layer.

Each of the second electrodes 220 includes sensing patterns 221 and bridge patterns 222. In an embodiment, one bridge pattern 222 electrically connects two adjacent sensing patterns 221 to each other, but embodiments of the present disclosure are not necessarily limited thereto. For example, in some embodiments, two adjacent sensing patterns 221 are electrically connected to each other through the plurality of bridge patterns 222.

The first electrodes 210 includes a first-first electrode 210-1, a first-second electrode 210-2, a first-third electrode 210-3, a first-fourth electrode 210-4, and a first-fifth electrode 210-5. The first-first electrode 210-1, the first-second electrode 210-2, the first-third electrode 210-3, the first-fourth electrode 210-4, and the first-fifth electrode 210-5 are classified according to the shapes thereof, and a plurality of at least some of the components may be provided.

A plurality of openings 210op are formed in the first electrodes 210. The openings 210op include first openings 210op1, second openings 210op2, third openings 210op3, fourth openings 210op4, and fifth openings 210op5. For example, one first opening 210op1 is formed in the first-first electrode 210-1, one second opening 210*op*2 is formed in the first-second electrode 210-2, one third opening 210*op*3 is formed in the first-third electrode 210-3, one fourth opening 210*op*4, and one fifth opening 210*op*5 are formed. One third opening 210*op*3, one fourth opening 210*op*4, and one fifth opening 210*op*5 are spaced apart from each other in the second direction DR2.

The first-first electrode 210-1, the first-third electrode 210-3, and the first-second electrode 210-2 are arranged in the first direction DR1. The first-fourth electrode 210-4 is interposed between the first-first electrode 210-1 and the first-third electrode 210-3, and the first-fifth electrode 210-5 is interposed between the first-third electrode 210-3 and the first-second electrode 210-2.

The sensing group 200G2 includes a central electrode 230 and a plurality of peripheral electrodes 240, 250, 260, and 270. The central electrode 230 and the peripheral electrodes 240, 250, 260, and 270 are disposed in the openings 210*op*. Accordingly, the second sensing group 200G2 overlaps the active region 1000A (see FIG. 1). Accordingly, the electronic device 1000 (see FIG. 1) can sense a gesture without increasing an area of the peripheral region 1000NA (see FIG. 1).

The peripheral electrodes 240, 250, 260, and 270 include the first peripheral electrode 240, the second peripheral electrode 250, the third peripheral electrode 260, and the fourth peripheral electrode 270 spaced apart from each other.

The first peripheral electrode 240 and the second peripheral electrode 250 are spaced apart from each other in the first direction DR1 with the central electrode 230 interposed therebetween, and the third peripheral electrode 260 and the fourth peripheral electrode 270 are spaced apart from each other in the second direction DR2 with the central electrode 230 interposed therebetween. In addition, the central electrode 230 is disposed at the center, and the fourth peripheral electrode 270, the second peripheral electrode 250, the third peripheral electrode 260, and the first peripheral electrode 240 are arranged clockwise. Accordingly, a downward gesture, an upward gesture, a rightward gesture, a leftward gesture, a clockwise gesture, and a counterclockwise gesture can be sensed by the central electrode 230 and the first to fourth peripheral electrodes 240, 250, 260, and 270.

As the distance between the central electrode 230 and each of the first to fourth peripheral electrodes 240, 250, 260, and 270 increases, the height of a gesture to be sensed increases. Accordingly, the distance between a transmission electrode, such as the central electrode 230, and a reception electrode, such as one of the first to fourth peripheral electrodes 240, 250, 260, and 270, in the second sensing group 200G2 is greater than the distance between a transmission electrode, such as the first electrode 210, and a reception electrode, such as the second electrode 220, in the first sensing group 200G1.

At least one of the first electrodes 210 or at least one second electrodes 220 is interposed between the central electrode 230 and the first to fourth peripheral electrodes 240, 250, 260, and 270. FIG. 6A shows that two first electrodes or two second electrodes are arranged between the central electrode 230 and each of the first to fourth peripheral electrodes 240, 250, 260, and 270, but embodiments of the present disclosure are not necessarily limited thereto. The openings 210*op* are not formed in the first electrodes, such as the first-fourth electrode 210-4 and the first-fifth electrode 210-5 disposed between the central electrode 230 and the first to fourth peripheral electrodes 240, 250, 260, and 270.

The sensor driving unit 200C receives a control signal I-CS from the main driving unit 1000C (see FIG. 2) and provides a signal I-SS to the main driving unit 1000C (see FIG. 2).

The sensor driving unit 200C may be an integrated circuit (IC) that is directly mounted in a specific region of the sensor layer 200, or mounted in the form of a chip on film (COF) on a separate printed circuit board that is electrically connected to the display layer 100.

The sensor driving unit 200C includes a sensor control circuit 200C1, a signal generating circuit 200C2, and an input detecting circuit 200C3. The sensor control circuit 200C1 controls operations of the signal generating circuit 200C2 and the input detecting circuit 200C3, in response to the control signal I-CS.

The sensor driving unit 200C is selectively driven in one of a first driving mode or a second driving mode. For example, the sensor driving unit 200C is driven in time division in the first driving mode and the second driving mode. The first driving mode controls the operation of the first sensing group 200G1, and the second driving mode controls the operation of the second sensing group 200G2. The first driving mode is a 2D touch sensing mode that senses coordinates of an external input, and the second driving mode is a 3D touch sensing mode that senses a gesture.

In the first driving mode, the signal generating circuit 200C2 sequentially outputs a driving signal DS1 to the sensor layer 200, such as the first electrodes 210. The input detecting circuit 200C3 receives sensing signals SS1 from the sensor layer 200. For example, the input detecting circuit 200C3 receives the sensing signals SS1 from the second electrodes 220. According to an embodiment of the present disclosure, the signal generating circuit 200C2 sequentially outputs the driving signal DS1 to the second electrodes 220, and the input detecting circuit 200C3 receives the sensing signals SS1 from the first electrodes 210. The driving signal DS1 may be referred to as a first driving signal, a first transmission signal, or a first TX signal, and the sensing signals SS1 may be referred to as first sensing signals, first receiving signals, or first RX signals.

In the second driving mode, the signal generating circuit 200C2 sequentially outputs a driving signal DS2 to the sensor layer 200, such as the central electrode 230. The input detecting circuit 200C3 receives sensing signals SS2 from the sensor layer 200, such as the first to fourth peripheral electrodes 240, 250, 260, and 270. The driving signal DS2 may be referred to as a second driving signal, a second transmission signal, or a second TX signal, and the sensing signals SS2 may be referred to as second sensing signals, second receiving signals, or second RX signals.

Figure 6B:
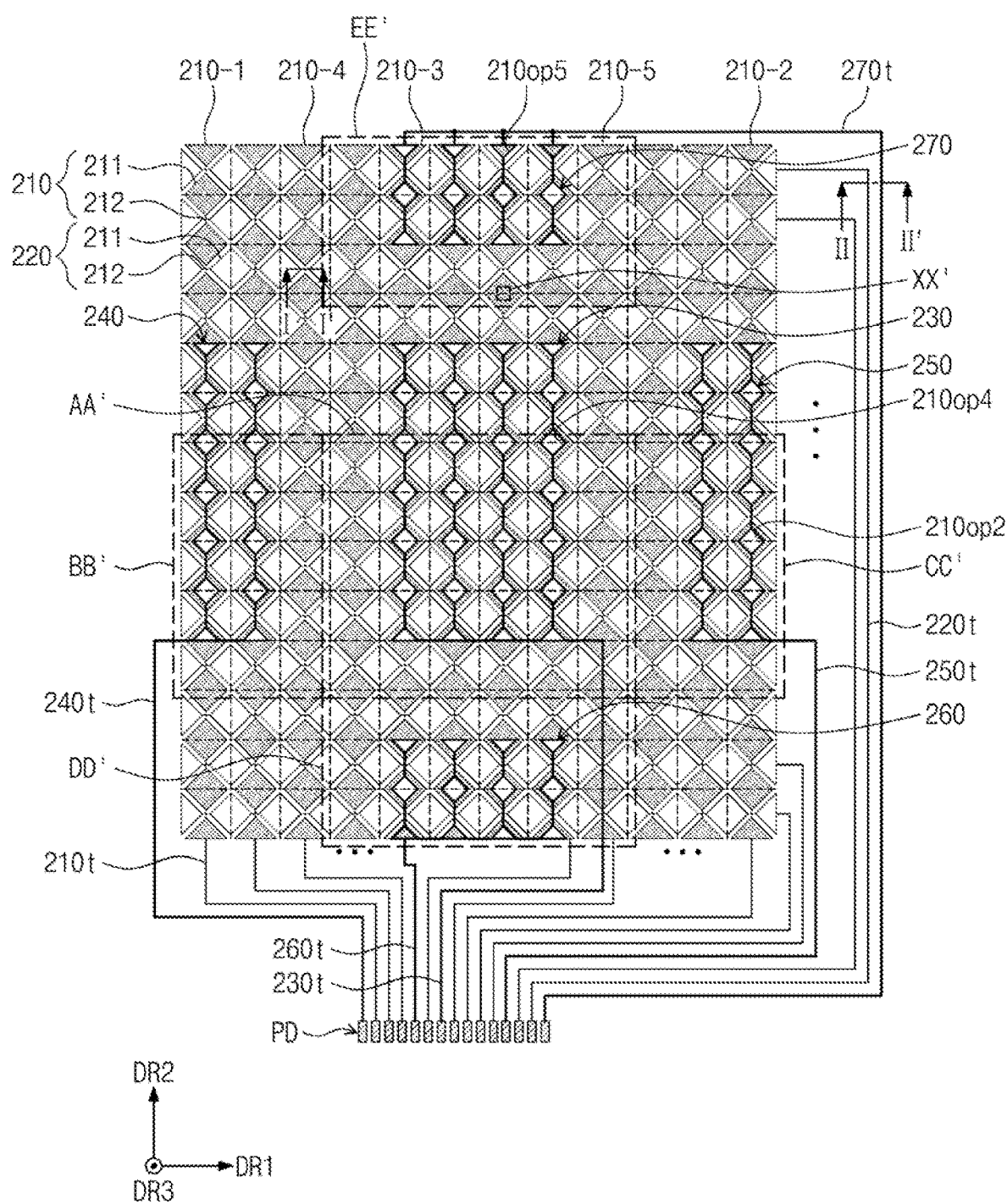
FIG. 6B is a plan view of a sensor layer according to an embodiment of the present disclosure.

FIG. 6B is a plan view of the sensor layer 200 according to an embodiment of the present disclosure.

Referring to FIGS. 6A and 6B, in an embodiment, a plurality of trace lines 210*t*, 220*t*, 230*t*, 240*t*, 250*t*, 260*t*, and 270*t* include a plurality of first trace lines 210*t* electrically connected to the first electrodes 210, a plurality of second trace lines 220*t* electrically connected to the second electrodes 220, a central trace line 230*t* electrically connected to the central electrode 230, a first peripheral trace line 240*t* electrically connected to the first peripheral electrode 240, a second peripheral trace line 250*t* electrically connected to the second peripheral electrode 250, a third peripheral trace line 260*t* electrically connected to the third peripheral electrode 260, and a fourth peripheral trace line 270*t* electrically connected to the fourth peripheral electrode 270.

According to an embodiment of the present disclosure, the central trace line 230t and the first to fourth peripheral trace lines 240t, 250t, 260t, and 270t are not adjacent to each other. For example, signal interference between the central trace line 230t and the first to fourth peripheral trace lines 240t, 250t, 260t, and 270t connected to the second sensing group 200G2 is reduced or eliminated. Accordingly, a gesture can be more exactly sensed.

According to an embodiment as illustrated in FIG. 6B, some first of the first trace lines 210t are disposed between the third peripheral trace line 260t and the central trace line 230t. Other first trace lines 210t and some second trace lines 220t are disposed between the central trace line 230t and the second peripheral trace line 250t. Other second trace lines 220t are disposed between the second peripheral trace line 250t and the fourth peripheral trace line 270t. Other first trace lines 210t are disposed between the first peripheral trace line 240t and the third peripheral trace line 260t.

However, embodiments are not necessarily limited thereto. For example, other embodiments include various modifications as long as at least some of the first trace lines 210t and the second trace lines 220t are disposed between the central trace line 230t and the first to fourth peripheral trace lines 240t, 250t, 260t, and 270t.

The trace lines 210t, 220t, 230t, 240t, 250t, 260t, and 270t are connected to a plurality of pads PD. Accordingly, the pads PD are electrically connected to the first sensing group 200G1 and the second sensing group 200G2.

Figure 7A:
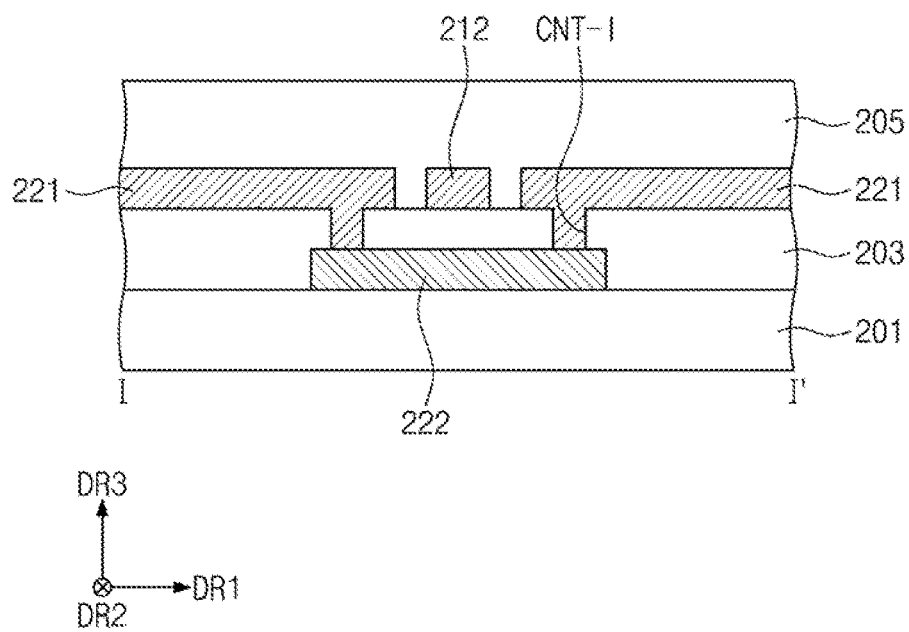
FIG. 7A is a cross-sectional view of a sensor layer taken along line I-I' in FIG. 6B according to an embodiment of the present disclosure.

FIG. 7A is a cross-sectional view of the sensor layer 200 taken along line I-I' in FIG. 6B, according to an embodiment of the present disclosure.

Referring to FIGS. 6B and 7A, in an embodiment, the sensor layer 200 has a bottom bridge structure. For example, the bridge pattern 222 is formed from the first conductive layer 202 (see FIG. 4), and the first part 211, the second part 212, and the sensing pattern 221 are formed from the second conductive layer 204 (see FIG. 4). The sensing pattern 221 is connected to the bridge pattern 222 through a contact hole CNT-I that penetrates through the sensing insulating layer 203.

Figure 7B:
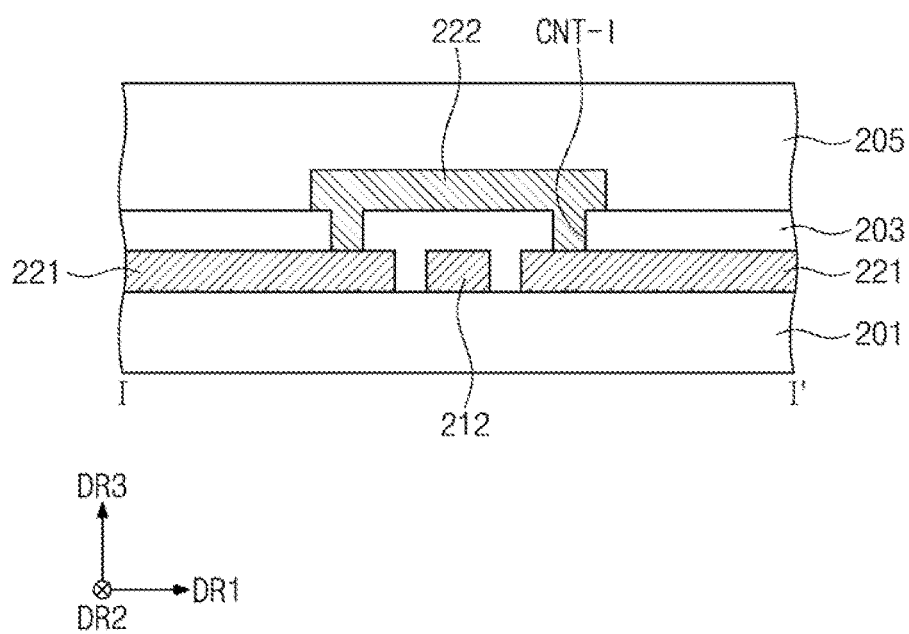
FIG. 7B is a cross-sectional view of a sensor layer taken along line I-I' in FIG. 6B, according to an embodiment of the present disclosure.

FIG. 7B is a cross-sectional view of the sensor layer 200 taken along line I-I' in FIG. 6B, according to an embodiment of the present disclosure.

Referring to FIGS. 6B and 7B, in an embodiment, the sensor layer 200 has a top bridge structure. For example, the bridge pattern 222 is formed from the second conductive layer 204 (see FIG. 4), and the first part 211, the second part 212, and the sensing pattern 221 are formed from the first conductive layer 202 (see FIG. 4). The bridge pattern 222 is connected to the sensing pattern 221 through the contact hole CNT-I that penetrates through the sensing insulating layer 203.

Figure 8A:
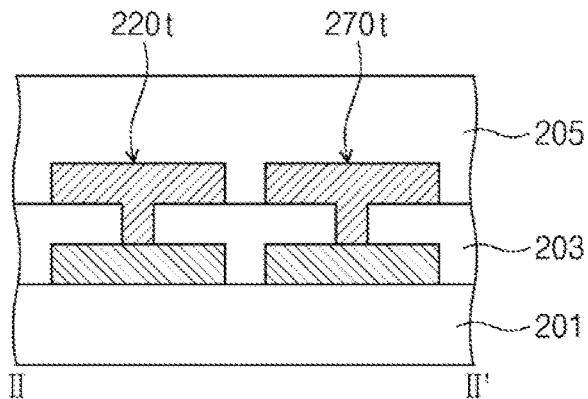
FIG. 8A is a cross-sectional view of a sensor layer taken along line II-II' in FIG. 6B, according to an embodiment of the present disclosure.
Figure 8A:
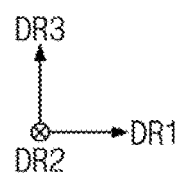

FIG. 8A is a cross-sectional view of the sensor layer 200 taken along line II-II' in FIG. 6B, according to an embodiment of the present disclosure.

According to an embodiment, FIG. 8A is a cross-sectional view of the second trace line 220t and the fourth peripheral trace line 270t, of the trace lines 210t, 220t, 230t, 240t, 250t, 260t, and 270t.

Each of the second trace line 220t and the fourth peripheral trace line 270t includes a plurality of layers. For example, each of the second trace line 220t and the fourth peripheral trace line 270t includes a first layer line formed from the first conductive layer 202 (see FIG. 4), a second layer line formed from the second conductive layer 204 (see FIG. 4), and the first layer line and the second layer line are electrically connected to each other. When each of the second trace line 220t and the fourth peripheral trace line 270t includes a plurality of layers, the resistance is lower.

Figure 8B:
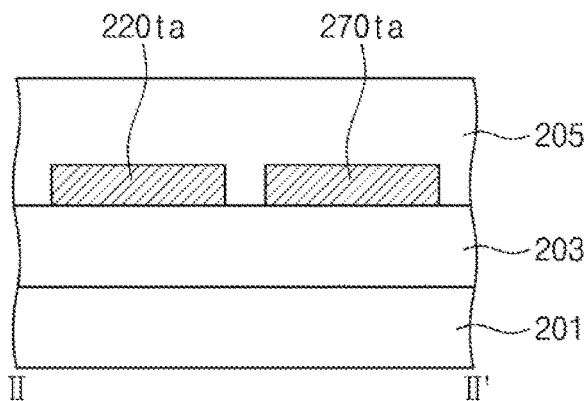
FIG. 8B is a cross-sectional view of a sensor layer taken along line II-II' in FIG. 6B according to an embodiment of the present disclosure.
Figure 8B:
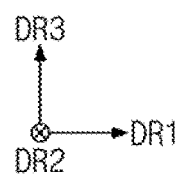

FIG. 8B is a cross-sectional view of the sensor layer 200 taken along line II-II' in FIG. 6B, according to an embodiment of the present disclosure.

According to an embodiment, FIG. 8B is a cross-sectional view of the second trace line 220ta and the fourth peripheral trace line 270ta of the trace lines 210t, 220t, 230t, 240t, 250t, 260t, and 270t (see FIG. 6B). Each of the second trace line 220ta and the fourth peripheral trace line 270ta is formed from the second conductive layer 204 (see FIG. 4). However, embodiments of the present disclosure are not necessarily limited thereto. In other embodiments, the second trace line 220ta and the fourth peripheral trace line 270ta are formed from the first conductive layer 202 (see FIG. 4) and is disposed between the base layer 201 and the sensing insulating layer 203.

According to an embodiment of the present disclosure, some of the trace lines 210t, 220t, 230t, 240t, 250t, 260t, and 270t have a multi-layer structure as illustrated in FIG. 8A, and other trace lines have a single-layer structure as illustrated in FIG. 8B. According to an embodiment of the present disclosure, some of the trace lines 210t, 220t, 230t, 240t, 250t, 260t, and 270t are formed from the first conductive layer 202 (see FIG. 4) and are interposed between the base layer 201 and the sensing insulating layer 203, and other trace lines are formed from the second conductive layer 204 (See FIG. 4).

Figure 9:
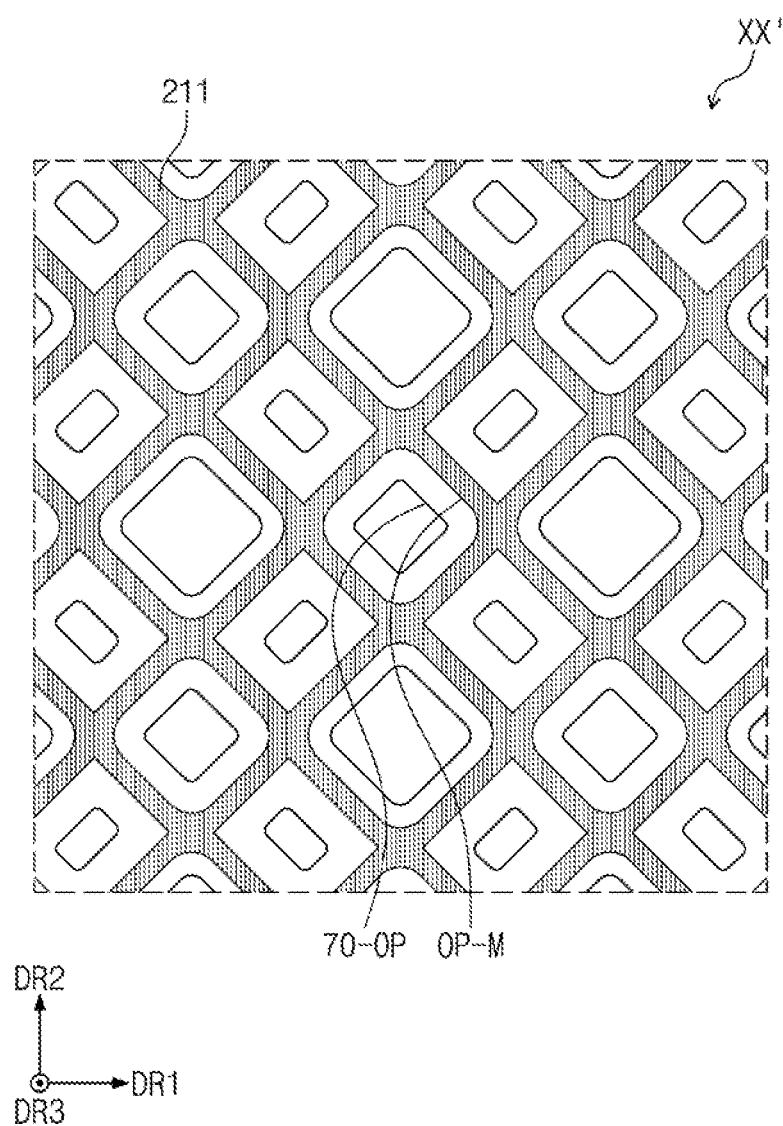
FIG. 9 is an enlarged plan view of region XX' in FIG. 6B.

FIG. 9 is an enlarged plan view of region XX' in FIG. 6B.

Referring to FIGS. 6B and 9, in an embodiment, the first part 211 has a mesh structure. An opening OP-M is formed in the first part 211. The opening OP-M overlaps the opening 70-OP formed in the pixel defining layer 70 (see FIG. 4). However, embodiments are not necessarily limited thereto, and in other embodiments, the opening OP-M overlaps a plurality of openings 70-OP.

The second part 212, the sensing pattern 221, the bridge pattern 222, the central electrode 230, and the peripheral electrodes 240, 250, 260, and 270 have substantially the same mesh structure as the first part 211.

Figure 10:
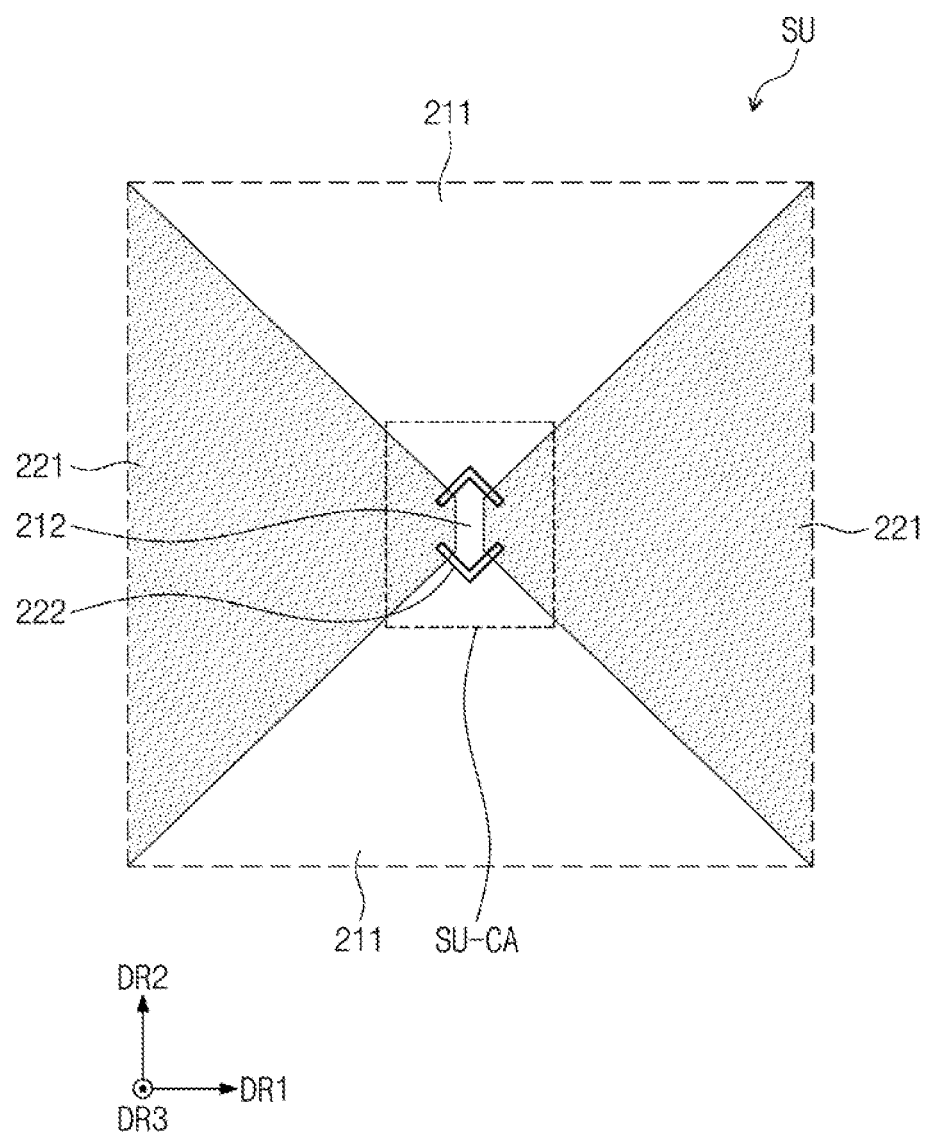
FIG. 10 is a plan view of a sensing unit according to an embodiment of the present disclosure.
Figure 11:
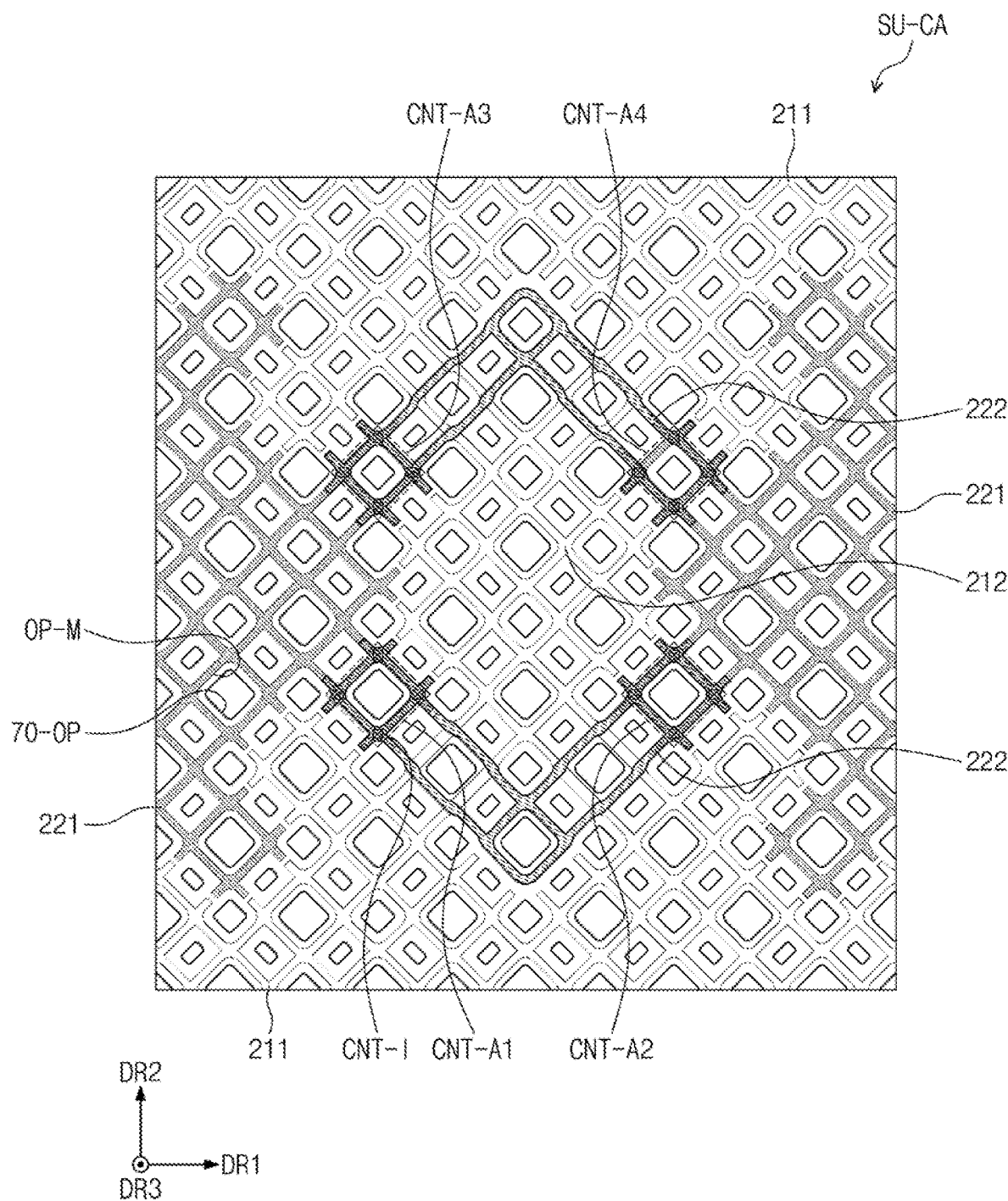
FIG. 11 is an enlarged plan view of a crossing region of a sensing unit according to an embodiment of the present disclosure.

FIG. 10 is a plan view of a sensing unit SU, according to an embodiment of the present disclosure. FIG. 11 is an enlarged plan view of a crossing region SU-CA of the sensing unit SU according to an embodiment of the present disclosure.

Referring to FIGS. 6B, 10, and 11, in an embodiment, the sensor layer 200 is divided into a plurality of sensing units SU. Each of the sensing units SU includes a crossing region between the first electrodes 210 and the second electrodes 220. The crossing region is where the bridge patterns 222 are disposed.

The sensing unit SU includes a half of the first portion 211, the second portion 212, another half of first portion 211 with the second portion 212 between the half of the first portion 211 and the another half of the first portion 211, a half of sensing pattern 221, two bridge patterns 222, and another half of sensing pattern 221.

Two bridge patterns 222 connect two sensing patterns 221 to each other. First to fourth connection regions CNT-A1 to CNT-A4 are provided between the two bridge patterns 222 and the two sensing patterns 221. Four contact holes CNT-1 are formed in the first to fourth connection regions CNT-A1 to CNT-A4, respectively. However, embodiments are not necessarily limited thereto. In other embodiments, two sensing patterns 221 are electrically connected to each other through one bridge pattern as described with reference to FIGS. 6A and 6B. In addition, according to an embodiment of the present disclosure, the two sensing patterns 221 are electrically connected to each other through at least three bridge patterns.

Figure 12:
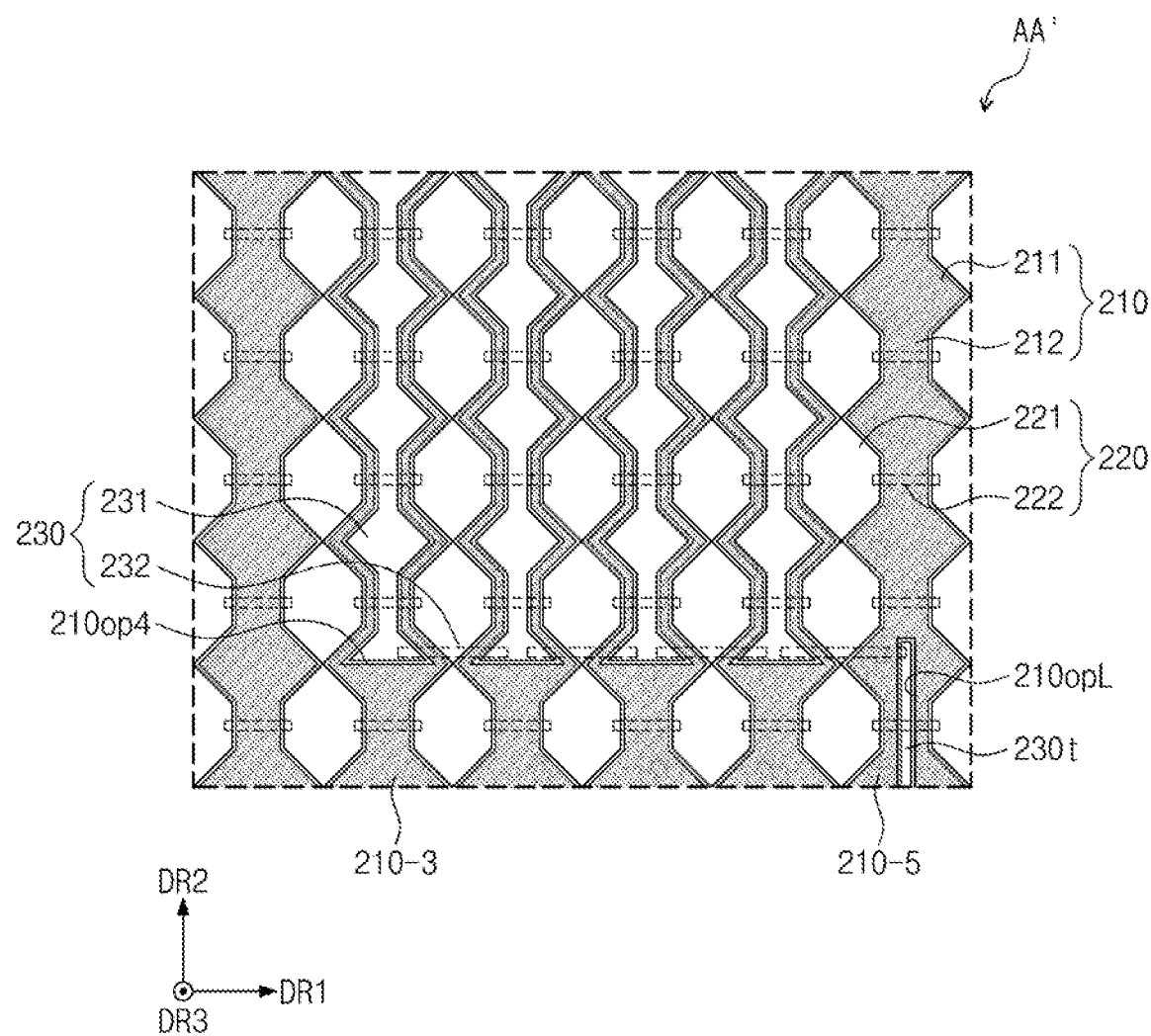
FIG. 12 is an enlarged plan view of region AA' in FIG. 6B.

FIG. 12 is an enlarged plan view of region AA' in FIG. 6B.

Referring to FIGS. 6A, 6B, and 12, in an embodiment, the central electrode 230 includes a plurality of central patterns 231 and a plurality of central bridge patterns 232. The central patterns 231 are arranged in the first direction DR1. Each of the central patterns 231 extends in the second direction DR2. The central bridge patterns 232 are electrically connected to the central patterns 231.

One central pattern 231 is disposed in each fourth opening 210op4. Two adjacent central patterns 231 are electrically connected to each other by one central bridge pattern 232.

According to an embodiment of the present disclosure, the central patterns 231 are included in the second conductive layer 204 (see FIG. 4), and the central bridge patterns 232 are included in the first conductive layer 202 (see FIG. 4). According to an embodiment of the present disclosure, the central patterns 231 are included in the first conductive layer 202 (see FIG. 4), and the central bridge patterns 232 are included in the second conductive layer 204 (see FIG. 4).

The central trace line 230t is electrically connected to the central electrode 230. For example, the central trace line 230t and one central pattern 231 closest to the central trace line 230t are electrically connected to each other through the central bridge pattern 232. A line opening 210opL is formed in one first electrode, such as the first-fifth electrode 210-5 of the first electrodes 210. The central trace line 230t overlaps the line opening 210opL. At least a portion of the central trace line 230t has a mesh structure that is similar to the first electrode 210. For example, a portion that overlaps the active region 1000A (see FIG. 1), of the central trace line 230t has a mesh structure.

Figure 13:
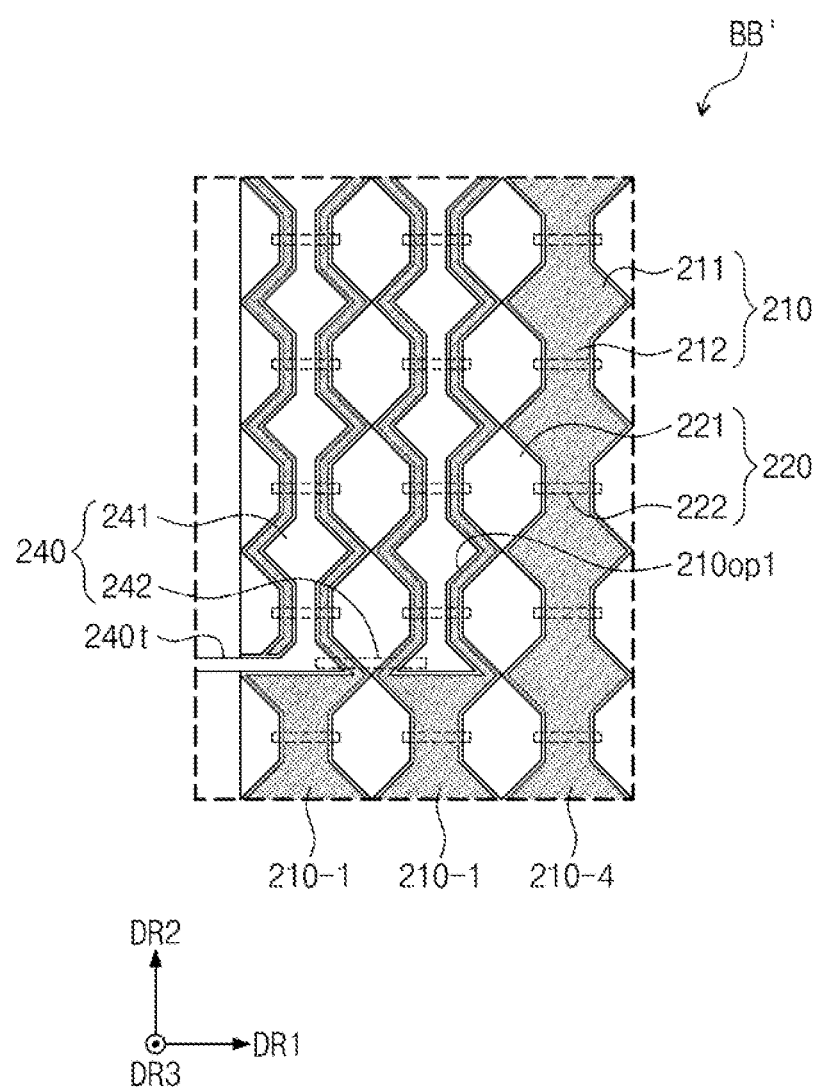
FIG. 13 is an enlarged plan view of region BB' in FIG. 6B.
Figure 14A:
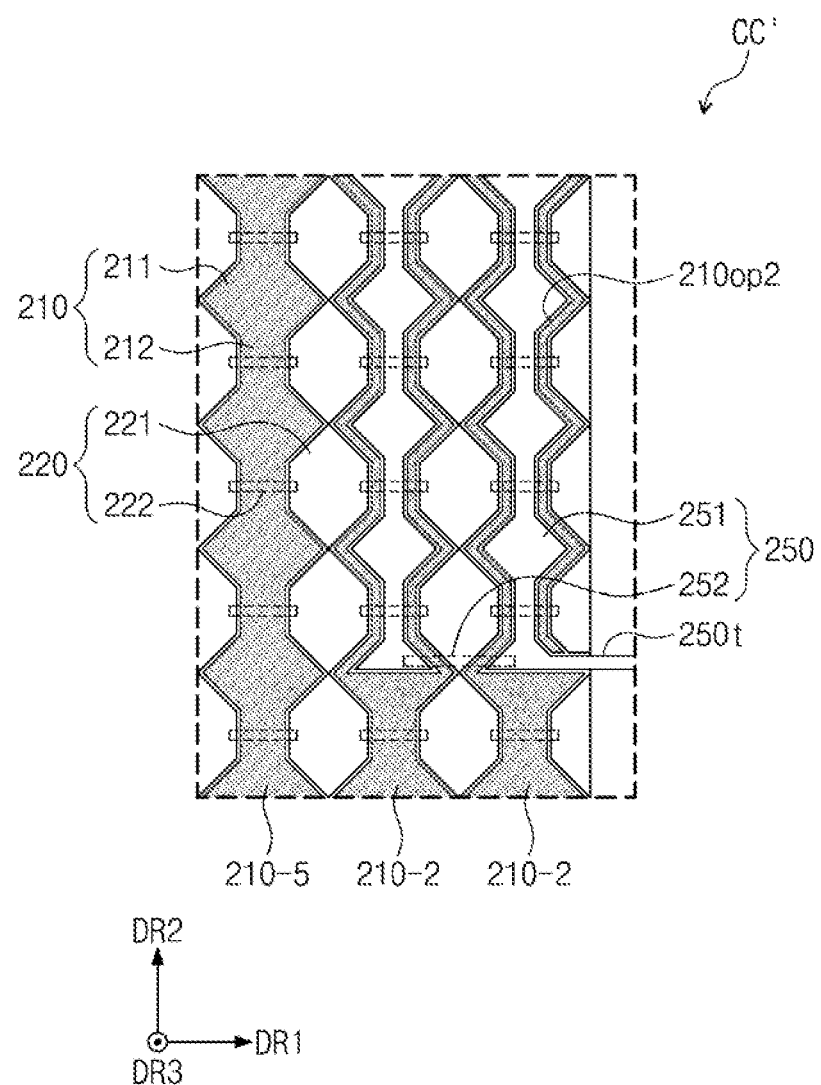
FIG. 14A is an enlarged plan view of region CC' in FIG. 6B.

FIG. 13 is an enlarged plan view of region BB' in FIG. 6B. FIG. 14A is an enlarged plan view of region CC' in FIG. 6B.

Referring to FIGS. 6A, 6B, 13 and 14A, in an embodiment, the first peripheral electrode 240 includes a plurality of first peripheral patterns 241 and a first peripheral bridge pattern 242. The first peripheral patterns 241 are arranged in the first direction DR1. Each of the first peripheral patterns 241 extends in the second direction DR2.

The second peripheral electrode 250 includes a plurality of second peripheral patterns 251 and a second peripheral bridge pattern 252. The second peripheral patterns 251 are arranged in the second direction DR2. Each of the second peripheral patterns 251 extends in the second direction DR2.

One first peripheral pattern 241 is disposed in each first opening 210op1. Two adjacent first peripheral patterns 241 are electrically connected to each other by the first peripheral bridge pattern 242. One second peripheral pattern 251 is disposed in the second opening 210op2. Two adjacent second peripheral patterns 251 are electrically connected to each other by the second peripheral bridge pattern 252.

In an embodiment, the first peripheral patterns 241 and the second peripheral patterns 251 are included in the second conductive layer 204 (see FIG. 4), and the first peripheral bridge pattern 242 and the second peripheral bridge pattern 252 are included in the first conductive layer 202 (see FIG. 4), but embodiments of the present disclosure are not necessarily limited thereto. For example, in an embodiment, the first peripheral patterns 241 and the second peripheral patterns 251 are included in the first conductive layer 202 (see FIG. 4), and the first peripheral bridge pattern 242 and the second peripheral bridge pattern 252 are included in the second conductive layer 204 (see FIG. 4).

The first peripheral trace line 240t is electrically connected to the first peripheral electrode 240, and the second peripheral trace line 250t is electrically connected to the second peripheral electrode 250. The first peripheral trace line 240t is disposed on the same layer as the first peripheral patterns 241. In addition, the second peripheral trace line 250t is disposed on the same layer as the second peripheral patterns 251. For example, the first peripheral trace line 240t is integrally formed together with one first peripheral pattern 241 and has a protruding and extending shape. The second peripheral trace line 250t is integrally formed together with one second peripheral pattern 251 and has a protruding and extending shape.

Referring to FIG. 6A, a first length LT1 of the central patterns 231 (see FIG. 12) in the second direction DR2 is substantially equal to a second length LT2 of the first peripheral patterns 241 in the second direction DR2 and a third length LT3 of the second peripheral patterns 251 in the second direction DR2.

The number of the first peripheral patterns 241 is equal to the number of the second peripheral patterns 251. Although FIGS. 13 and 14A show two first peripheral patterns 241 and two second peripheral patterns 251, embodiments of the present disclosure are not necessarily limited thereto. For example, in an embodiment, one first peripheral pattern 241 and one second peripheral patterns 251 are provided. For example, the first peripheral bridge pattern 242 and the second peripheral bridge pattern 252 are omitted. The number of the first peripheral patterns 241 and the number of the second peripheral patterns 251 may be three or more. For example, as the number of the first peripheral patterns 241 and the number of the second peripheral patterns 251 increases, the number of first peripheral bridge patterns 242 and the number of second peripheral bridge patterns 252 may be two or more.

Figure 14B:
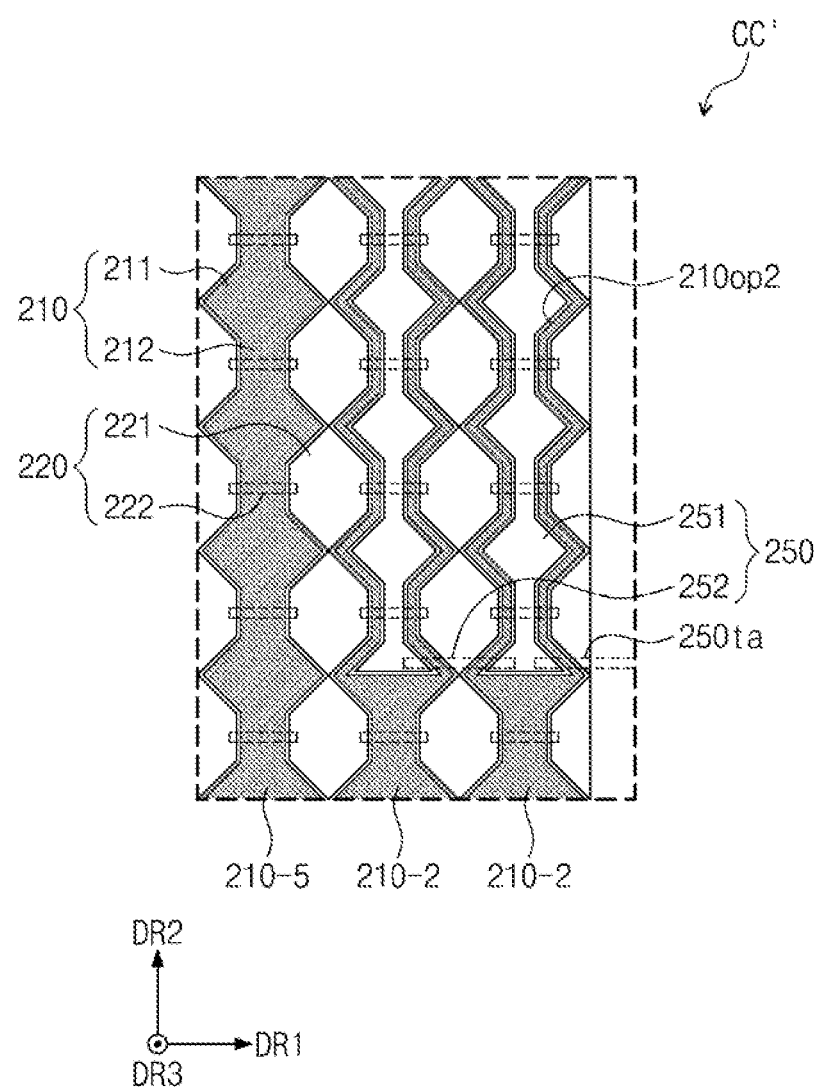
FIG. 14B is an enlarged plan view of a region that corresponds to region CC' in FIG. 6B, according to an embodiment of the present disclosure.

FIG. 14B is an enlarged plan view of a region corresponding to region CC' in FIG. 6B, according to an embodiment of the present disclosure.

Referring to FIG. 14B, in an embodiment, the second peripheral trace line 250ta is electrically connected to the second peripheral electrode 250. At least a portion of the second peripheral trace line 250ta is disposed in the same layer as the second peripheral bridge pattern 252. For example, in an embodiment, referring to FIG. 6B, the entire portion of the second peripheral trace line 250ta is disposed in the same layer as the second peripheral bridge pattern 252. For example, in an embodiment, a portion that overlaps the first-second electrode 210-2 of the second peripheral trace line 250ta is included in the first conductive layer 202 (see FIG. 4), and the remaining portion of the second peripheral trace line 250ta is included in the second conductive layer 204 (see FIG. 4). For example, in an embodiment, the remaining portion of the second peripheral trace line 250ta has a multi-layer structure as described in FIG. 8A.

Although only the second peripheral trace line 250ta has been described with reference to FIG. 14B, the description presented with reference to FIG. 14B also applies to the first peripheral trace line 240t (see FIG. 13).

Figure 15:
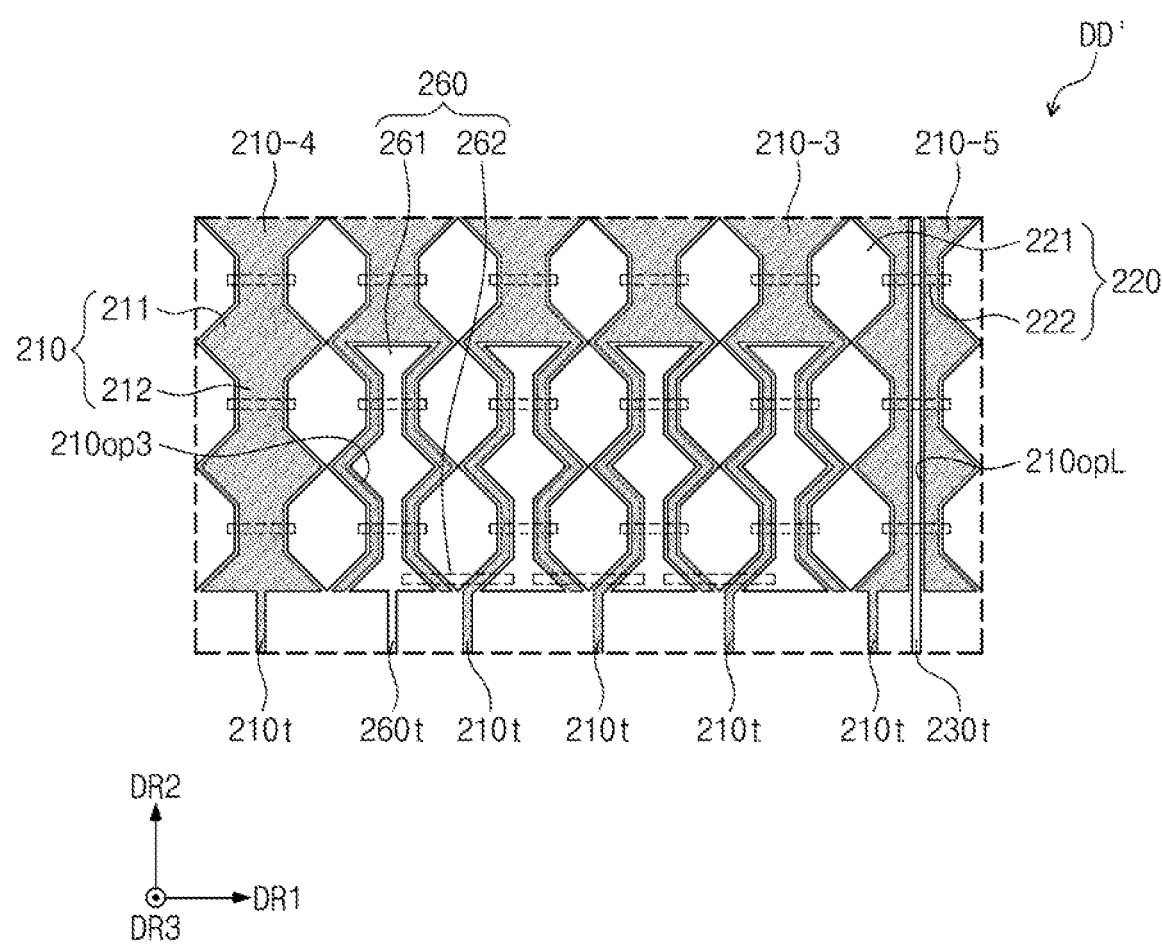
FIG. 15 is an enlarged plan view of region DD' in FIG. 6B.

FIG. 15 is an enlarged plan view of region DD' in FIG. 6B.

Referring to FIGS. 6A, 6B, and 15, in an embodiment, the third peripheral electrode 260 includes a plurality of third peripheral patterns 261 and a plurality of third peripheral bridge patterns 262. The third peripheral patterns 261 are arranged in the first direction DR1. Each of the third peripheral patterns 261 extends in the second direction DR2.

One third peripheral pattern 261 is disposed in each third opening 210op3. Two adjacent third peripheral patterns 261 are electrically connected to each other by the third peripheral bridge pattern 262. In an embodiment, the third peripheral patterns 261 are included in the second conductive layer 204 (see FIG. 4), and the third peripheral bridge pattern 262 are included in the first conductive layer 202 (see FIG. 4), but the present disclosure is not limited thereto. For example, in an embodiment, the third peripheral patterns 261 are included in the first conductive layer 202 (see FIG. 4), and the third peripheral bridge patterns 262 are included in the second conductive layer 204 (see FIG. 4).

The peripheral trace line 260t is electrically connected to the third peripheral electrode 260.

Figure 16A:
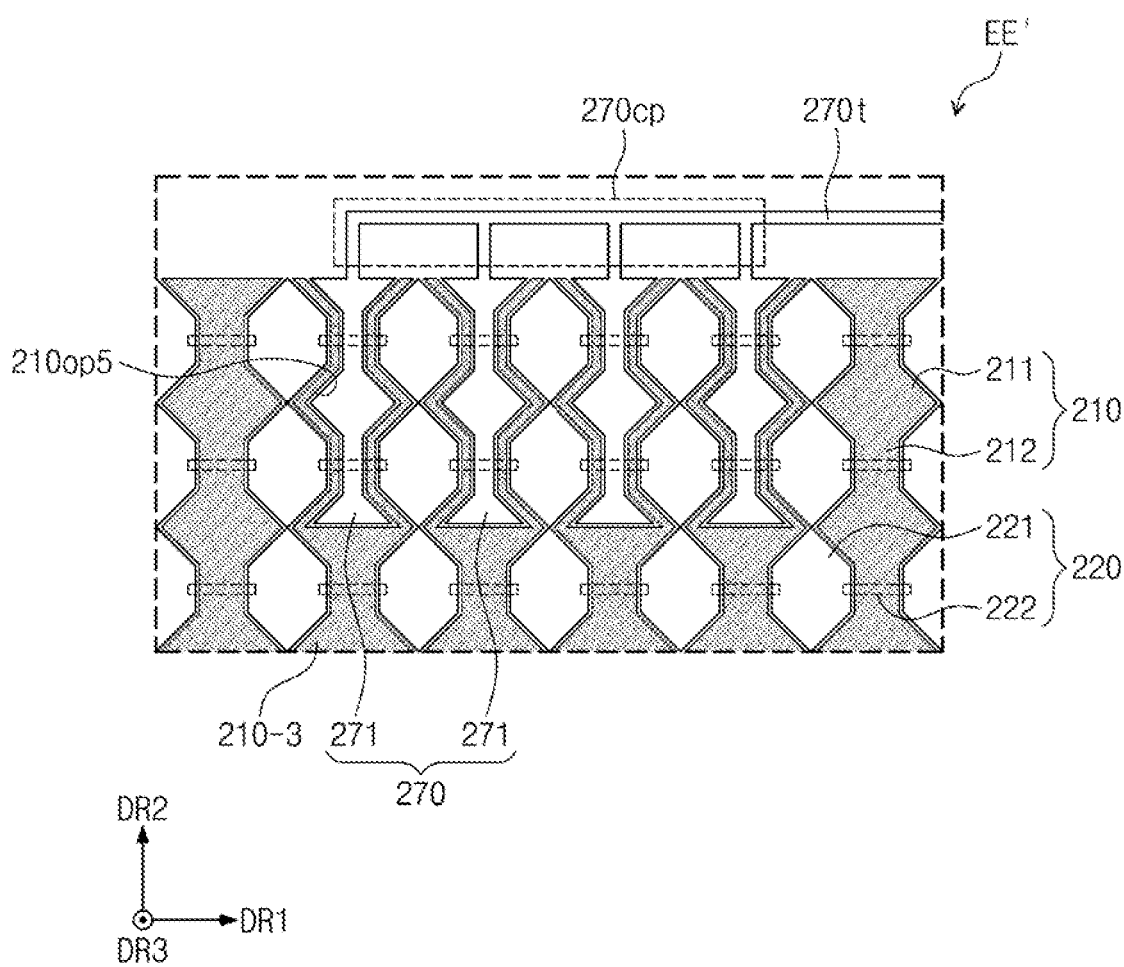
FIG. 16A is an enlarged plan view of region EE' in FIG. 6B.

FIG. 16A is an enlarged plan view of region EE' in FIG. 6B.

Referring to FIGS. 6A, 6B, and 16A, in an embodiment, the fourth peripheral electrode 270 includes a plurality of fourth peripheral patterns 271. The fourth peripheral patterns 271 are arranged in the first direction DR1. Each of the fourth peripheral patterns 271 extends in the second direction DR2. One fourth peripheral pattern 271 is disposed in each fifth opening 210op5. In an embodiment, the fourth peripheral patterns 271 are included in the second conductive layer 204 (see FIG. 4), but embodiments of the present disclosure are not necessarily limited thereto. For example, in an embodiment, the fourth peripheral patterns 271 are included in the first conductive layer 202 (see FIG. 4).

The fourth peripheral electrode 270 is spaced apart from the pads PD with the third peripheral electrode 260 interposed therebetween. No other trace lines are disposed around the fourth peripheral trace line 270t. Accordingly, the fourth peripheral patterns 271 are electrically connected to each other by a connection trace portion 270cp. The connection trace portion 270cp overlaps the peripheral region 1000NA (see FIG. 1). The fourth peripheral trace line 270t is electrically connected to the fourth peripheral electrode 270 through the connection trace portion 270cp.

Referring to FIGS. 12, 15, and 16A together, in an embodiment, the number of third peripheral patterns 261 is equal to the number of fourth peripheral patterns 271. The number of the third peripheral patterns 261 and the number of the fourth peripheral patterns 271 are equal to the number of the central patterns 231

Although FIGS. 12, 15, and 16A show that the number of third peripheral patterns 261, the number of fourth peripheral patterns 271, and the number of central patterns 231 are four, embodiments of the present disclosure are not necessarily limited thereto. For example, in some embodiments, the number of peripheral patterns may be one or two or more.

Figure 16B:
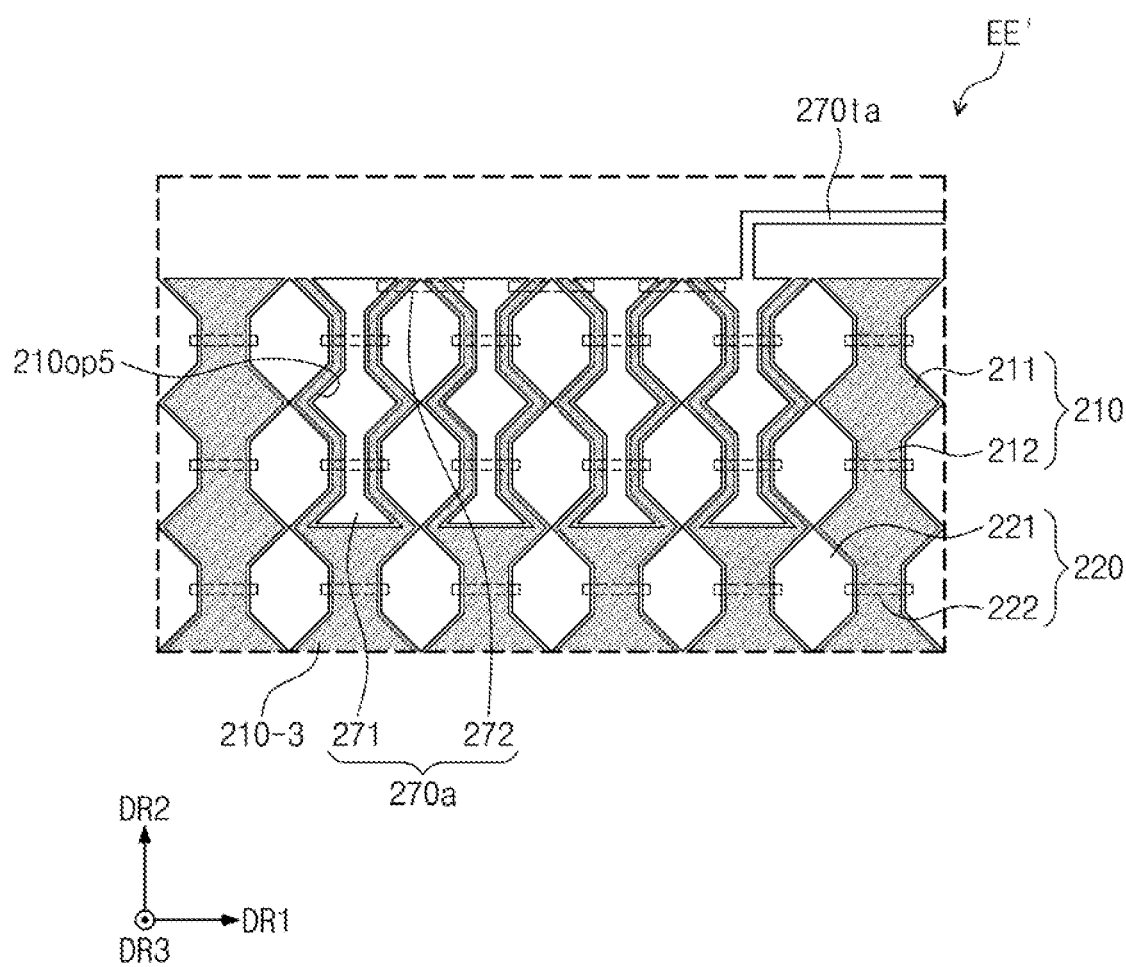
FIG. 16B is an enlarged plan view of a region that corresponds to region EE' in FIG. 6B according to an embodiment of the present disclosure.

FIG. 16B is an enlarged plan view of a region that corresponds to region EE' in FIG. 6B according to an embodiment of the present disclosure.

Referring to FIG. 16B, in an embodiment, the fourth peripheral electrode 270a includes fourth peripheral patterns 271 and fourth peripheral bridge patterns 272. The fourth peripheral patterns 271 are arranged in the first direction DR1. Each of the fourth peripheral patterns 271 extends in the second direction DR2.

Two adjacent fourth peripheral patterns 271 are electrically connected to each other by the fourth peripheral bridge pattern 272. The fourth peripheral trace line 270ta is directly connected to the fourth peripheral electrode 270a. In an embodiment, the fourth peripheral patterns 271 are included in the second conductive layer 204 (see FIG. 4), and the fourth peripheral bridge patterns 272 are included in the first conductive layer 202 (see FIG. 4), but embodiments of the present disclosure are not necessarily limited thereto. For example, in an embodiment, the fourth peripheral patterns 271 are included in the first conductive layer 202 (see FIG. 4), and the fourth peripheral bridge patterns 272 are included in the second conductive layer 204 (see FIG. 4).

Figure 17:
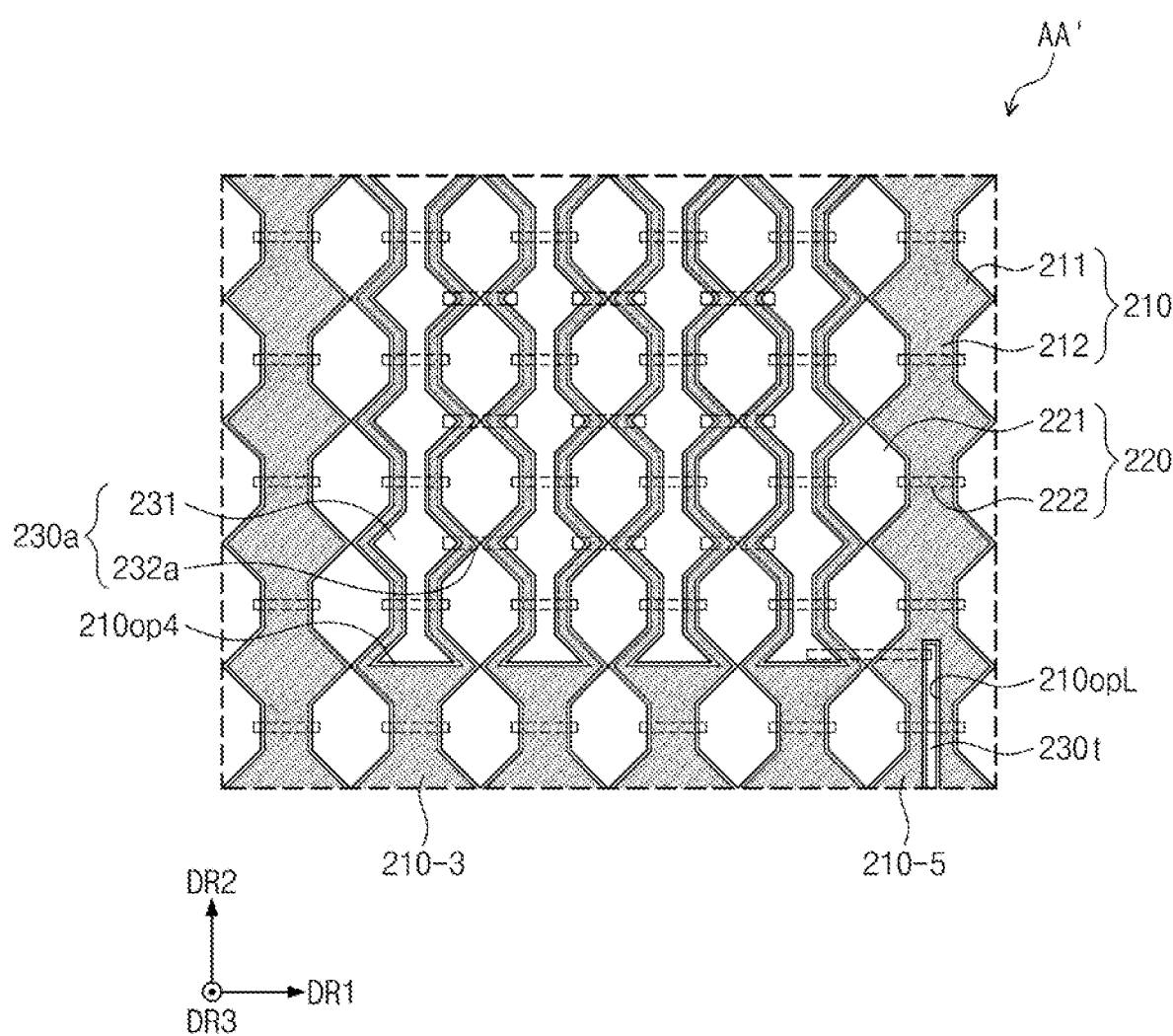
FIG. 17 is an enlarged plan view of a region that corresponds to region AA' region in FIG. 6B, according to an embodiment of the present disclosure.

FIG. 17 is an enlarged plan view of a region that corresponds to region AA' in FIG. 6B, according to an embodiment of the present disclosure.

Referring to FIG. 17, in an embodiment, a central electrode 230a includes the central patterns 231 and central bridge patterns 232a. The embodiment illustrated in FIG. 17 has a greater number of central bridge patterns 232a than an embodiment illustrated in FIG. 12. For example, two adjacent central patterns 231 are electrically connected to each other by one central bridge pattern 232. An embodiment illustrated in FIG. 17 can be applied to the bridge patterns described with reference to FIGS. 13, 14A, 15, and 16B.

Figure 18:
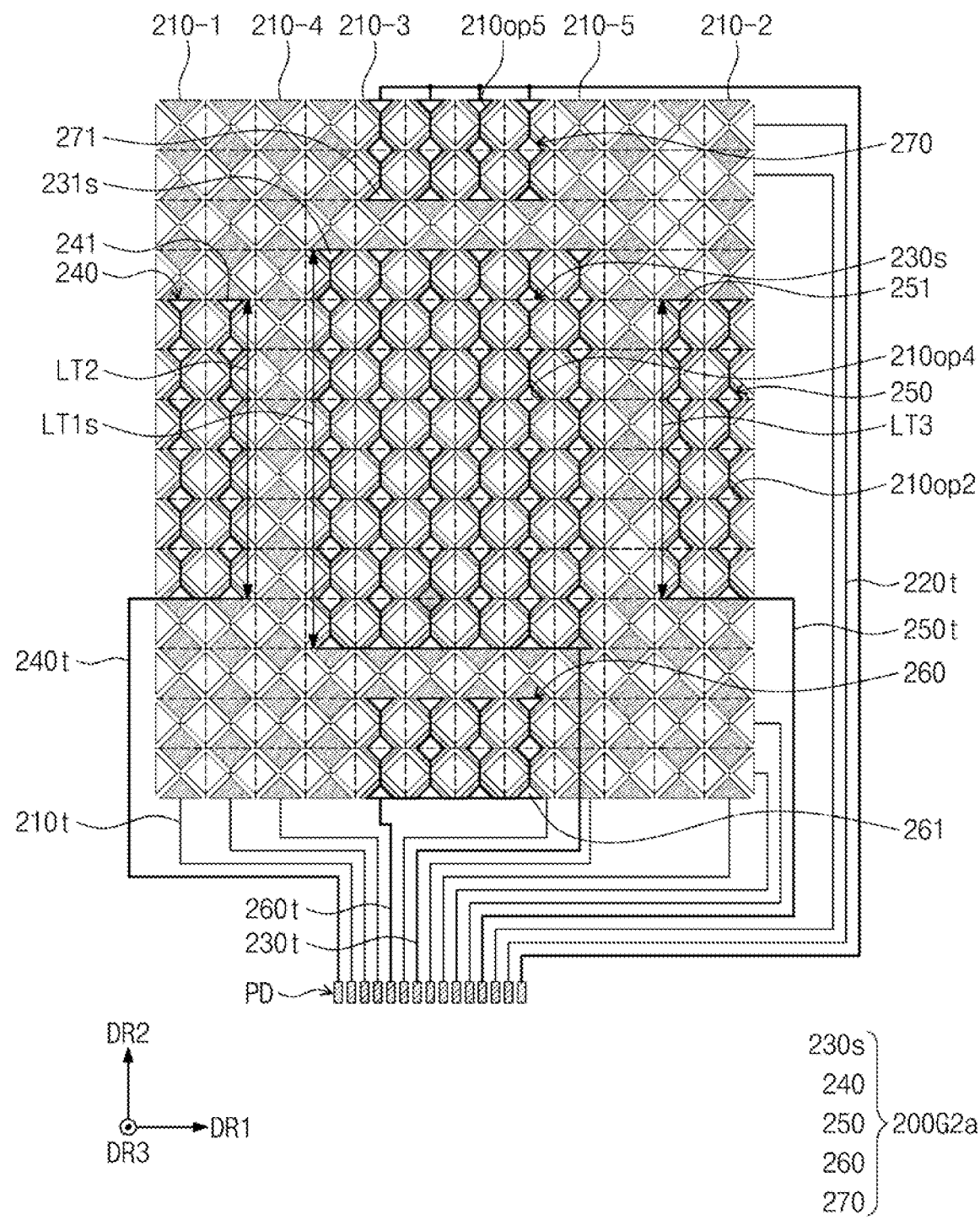
FIG. 18 is a plan view of a sensor layer according to an embodiment of the present disclosure.

FIG. 18 is a plan view of a sensor layer according to an embodiment of the present disclosure.

Referring to FIG. 18, in an embodiment, a second sensing group 200G2a includes the central electrode 230s and the plurality of peripheral electrodes 240, 250, 260, and 270. An embodiment illustrated in FIG. 18 has a larger size central electrode 230s when compared to an embodiment illustrated in FIG. 6B.

The width of the central electrode 230s in the first direction DR1 is greater than the width in the first direction DR1 of each of the third peripheral electrode 260 and the fourth peripheral electrode 270. In addition, the width of the central electrode 230s in the second direction DR2 is greater than the width in the second direction DR2 of each of the first peripheral electrode 240 and the second peripheral electrode 250.

A first length LT1s of the central pattern 231 of the central electrode 230s in the second direction DR2 is greater than the second length LT2 of the first peripheral pattern 241 in the second direction DR2 and the third length LT3 of the second peripheral pattern 251 in the second direction DR2. In addition, the number of third peripheral patterns 261 and the number of fourth peripheral patterns 271 are each less than the number of the central patterns 231.

Figure 19:
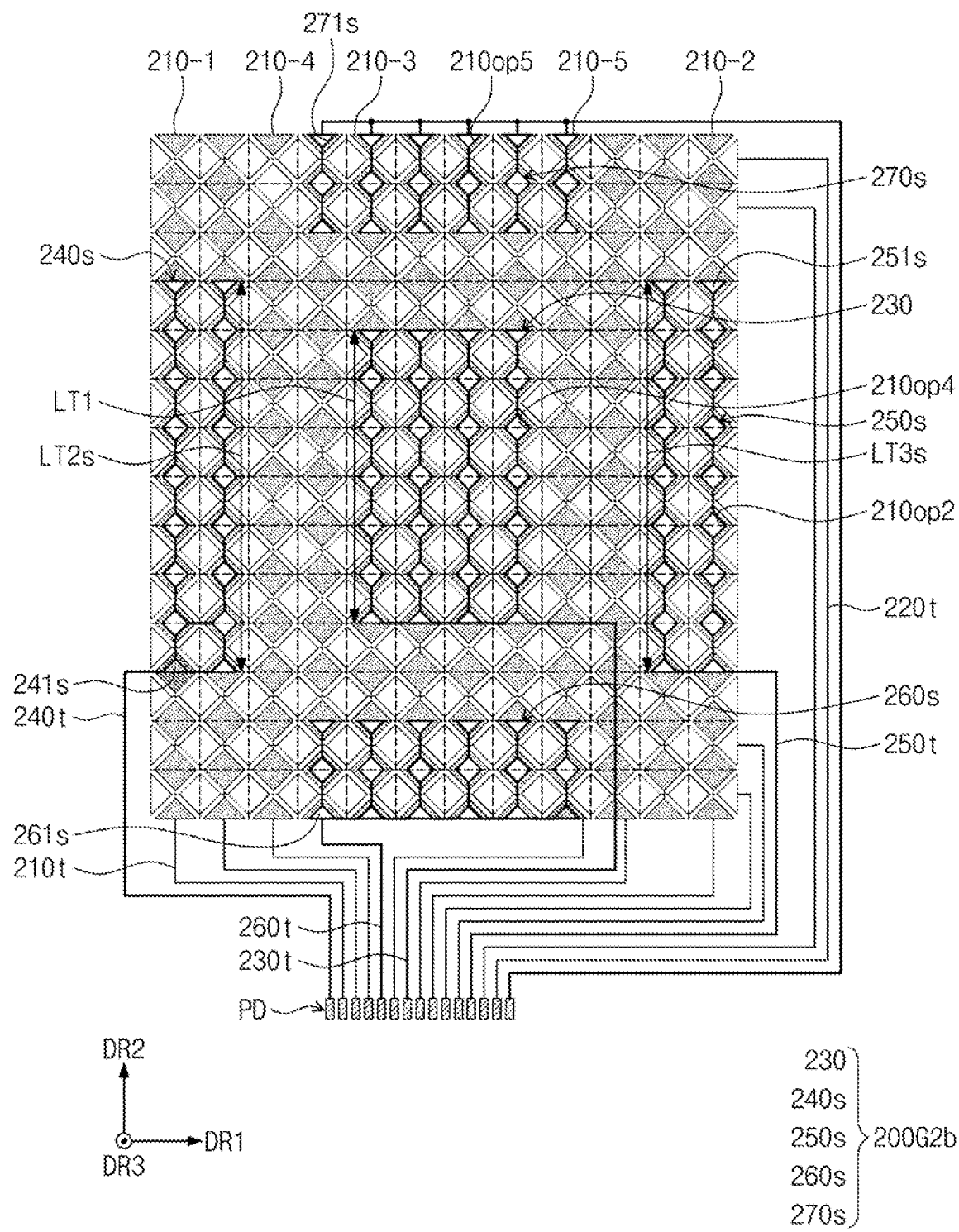
FIG. 19 is a plan view of a sensor layer according to an embodiment of the present disclosure.

FIG. 19 is a plan view of a sensor layer according to an embodiment of the present disclosure.

Referring to FIG. 19, in an embodiment, a second sensing group 200G2b includes the central electrode 230 and the plurality of peripheral electrodes 240s, 250s, 260s, and 270s. An embodiment illustrated in FIG. 19 has larger size peripheral electrodes 240s, 250s, 260s, and 270s, when compared to an embodiment illustrated in FIG. 6B.

The width of the central electrode 230 in the first direction DR1 is less than the width in the first direction DR1 of each of the third peripheral electrode 260s and the fourth peripheral electrode 270s. In addition, the width of the central electrode 230s in the second direction DR2 is less than the width in the second direction DR2 of each of the first peripheral electrode 240s and the second peripheral electrode 250s.

The first length LT1 of the central pattern 231 of the central electrode 230 in the second direction DR2 is less than the second length LT2s of the first peripheral pattern 241s in the second direction DR2 and the third length LT3s of the second peripheral pattern 251s in the second direction DR2. In addition, the number of the third peripheral patterns 261s and the number of the fourth peripheral patterns 271s are each greater than the number of the central patterns 231

Figure 20:
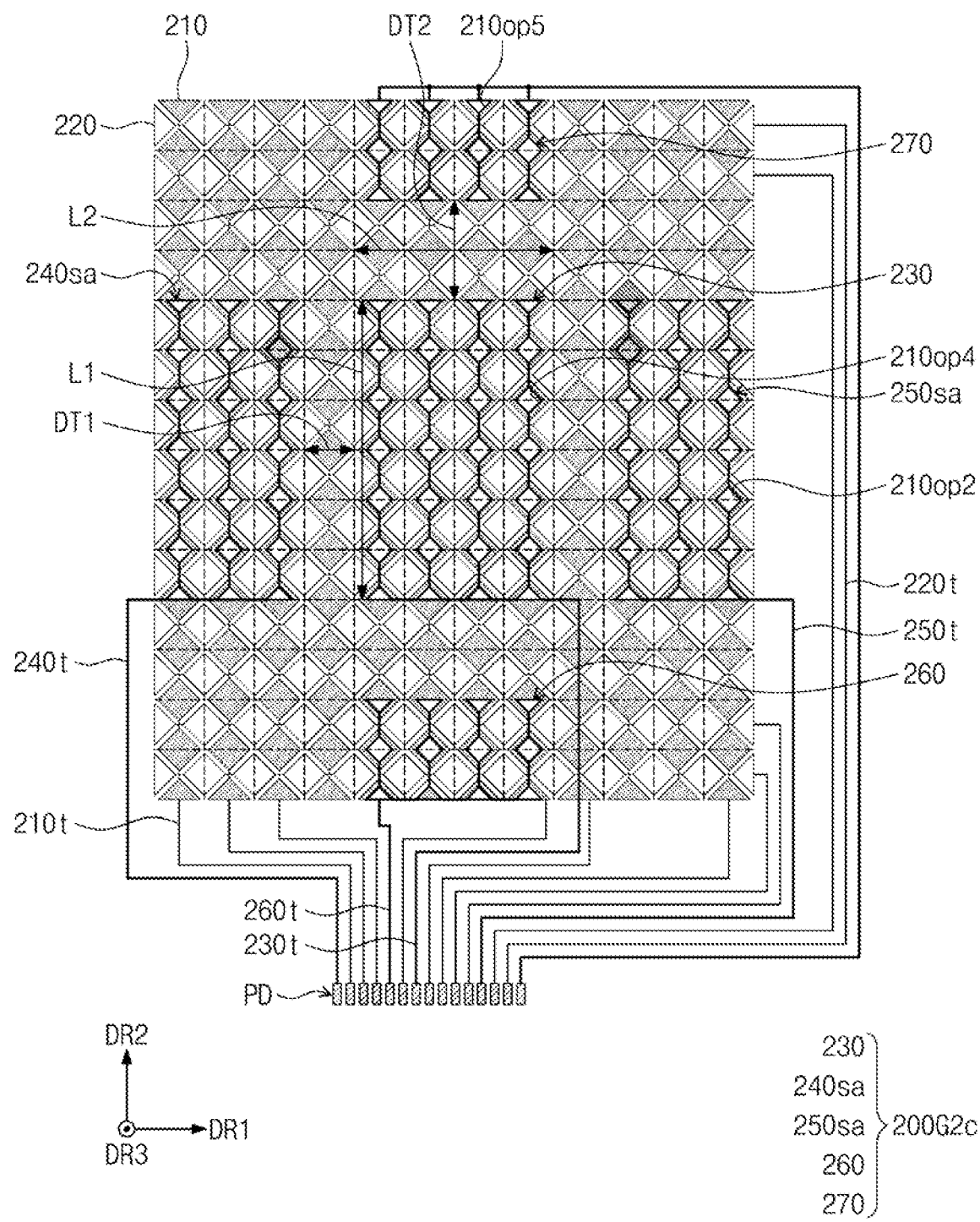
FIG. 20 is a plan view of a sensor layer according to an embodiment of the present disclosure.

FIG. 20 is a plan view of a sensor layer according to an embodiment of the present disclosure.

Referring to FIG. 20, in an embodiment, the second sensing group 200G2c includes the central electrode 230 and first to fourth peripheral electrodes 240sa, 250sa, 260, and 270. An embodiment illustrated in FIG. 20 has larger size first peripheral electrode 240sa and second peripheral electrode 250sa when compared to an embodiment illustrated in FIG. 6B.

One first electrode 210 is interposed between the central electrode 230 and the first peripheral electrode 240sa, and one first electrode 210 is interposed between the central electrode 230 and the second peripheral electrode 250sa. Two second electrodes 220 are interposed between the central electrode 230 and the third peripheral electrode 260, and two second electrodes 220 are interposed between the central electrode 230 and the fourth peripheral electrode 270.

A distance DT1 between the central electrode 230 and the first peripheral electrode 240sa is less than a distance DT2 between the central electrode 230 and the third peripheral electrode 260. In addition, a length L1 of a portion of the central electrode 230 that faces the first peripheral electrode 240sa is longer than a length L2 of a portion of the central electrode 230 that faces the fourth peripheral electrode 270.

According to an embodiment of the present disclosure, a distance between the central electrode 230 and the first to fourth peripheral electrodes 240sa, 250sa, 260, and 270 can be changed based on the capacitance between the central electrode 230 and each of the first to fourth peripheral electrodes 240sa, 250sa, 260, and 270

As described above, coordinates of an external input can be sensed by the first sensing group, and a gesture can be sensed by the second sensing group. The first sensing group and the second sensing group overlap the active region. Accordingly, electronic device is provided that can sense a gesture without increasing the size of the peripheral region.

In addition, the central trace line connected to the second sensing group and the first to fourth trace lines are not adjacent to each other. Accordingly, signal interference between the central trace line and the first to fourth peripheral trace lines can be reduced or eliminated. Accordingly, the gesture can be more exactly sensed.

Although embodiments of the present disclosure have been described for illustrative purposes, those skilled in the art will appreciate that various modifications, and substitutions are possible, without departing from the scope and spirit of embodiments of the disclosure as recited in the accompanying claims. Accordingly, the technical scope of embodiments of the inventive concept is not limited to the detailed description of this specification, but should be defined by the claims.

What is claimed is:

1. An electronic device, comprising:
a first sensing group that includes a plurality of first electrodes arranged in a first direction and a plurality of second electrodes arranged in a second direction that crosses the first direction; and
a second sensing group that includes a central electrode and a plurality of peripheral electrodes disposed in a plurality of openings formed in some of the plurality of first electrodes,
wherein at least one first electrode of the plurality of first electrodes or at least one second electrode of the plurality of second electrodes is interposed between the central electrode and each of the plurality of peripheral electrodes,
wherein the plurality of peripheral electrodes include:
a first peripheral electrode, a second peripheral electrode, a third peripheral electrode, and a fourth peripheral electrode spaced apart from each other,
wherein the first peripheral electrode and the second peripheral electrode are spaced apart from each other in the first direction with the central electrode interposed between the first peripheral electrode and the second peripheral electrode, and
wherein the third peripheral electrode and the fourth peripheral electrode are spaced apart from each other in the second direction with the central electrode interposed between the third peripheral electrode and the fourth peripheral electrode.

2. The electronic device of claim 1, wherein no openings are formed in the at least one first electrode.

3. The electronic device of claim 1, wherein the central electrode includes:
a plurality of central patterns arranged in the first direction, wherein each of the plurality of central patterns extends in the second direction; and
a central bridge pattern that electrically connects the plurality of central patterns to each other.

4. The electronic device of claim 3, further comprising:
a central trace line electrically connected to the central electrode,
wherein a line opening is formed in one first electrode of the plurality of first electrodes, and
wherein the central trace line overlaps the line opening.

5. The electronic device of claim 3,
wherein the first peripheral electrode includes:
a plurality of first peripheral patterns arranged in the first direction, wherein each of the plurality of first peripheral patterns extends in the second direction; and
a first peripheral bridge pattern that electrically connects the plurality of first peripheral patterns to each other, and
wherein the second peripheral electrode includes:
a plurality of second peripheral patterns arranged in the first direction, wherein each of the plurality of second peripheral patterns extends in the second direction; and
a second peripheral bridge pattern that electrically connects the plurality of second peripheral patterns to each other, and
wherein a number of the plurality of first peripheral patterns is equal to a number of the plurality of second peripheral patterns.

6. The electronic device of claim 5, wherein a first length in the second direction of each of the plurality of central patterns is substantially equal to a second length in the second direction of each of the plurality of first peripheral patterns and a third length in the second direction of each of the plurality of second peripheral patterns.

7. The electronic device of claim 3,
wherein the third peripheral electrode includes:
a plurality of third peripheral patterns arranged in the first direction, wherein each of the plurality of third peripheral patterns extends in the second direction; and
a third peripheral bridge pattern that electrically connects the plurality of third peripheral patterns to each other,
wherein the fourth peripheral electrode includes:
a plurality of fourth peripheral patterns arranged in the first direction, wherein each of the plurality of fourth peripheral patterns extends in the second direction, and wherein a number of the plurality of third peripheral patterns is equal to a number of the plurality of fourth peripheral patterns.

8. The electronic device of claim 7, wherein the number of the plurality of third peripheral patterns and the number of the plurality of fourth peripheral patterns are equal to a number of the plurality of central patterns.

9. The electronic device of claim 7, further comprising:
a connection trace portion that electrically connects the plurality of fourth peripheral patterns to each other.

10. The electronic device of claim 9, further comprising:
a plurality of pads electrically connected to the first sensing group and the second sensing group, wherein the fourth peripheral electrode is spaced apart from the plurality of pads with the third peripheral electrode interposed between the fourth peripheral electrode and the plurality of pads.

11. The electronic device of claim 7, further comprising:
a plurality of first trace lines electrically connected to the plurality of first electrodes, respectively;
a plurality of second trace lines electrically connected to the plurality of second electrodes, respectively;
a central trace line electrically connected to the central electrode;
a first peripheral trace line electrically connected to the first peripheral electrode;
a second peripheral trace line electrically connected to the second peripheral electrode;
a third peripheral trace line electrically connected to the third peripheral electrode; and
a fourth peripheral trace line electrically connected to the fourth peripheral electrode.

12. The electronic device of claim 11,
wherein some first trace lines of the plurality of first trace lines are interposed between the third peripheral trace line and the central trace line,
wherein other first trace lines of the plurality of first trace lines and some second trace lines of the plurality of second trace lines are interposed between the central trace line and the second peripheral trace line,
wherein other second trace lines of the plurality of second trace lines are interposed between the second peripheral trace line and the fourth peripheral trace line, and
wherein still other first trace lines of the plurality of first trace lines are disposed between the first peripheral trace line and the third peripheral trace line.

13. An electronic device, comprising:
a first sensing group that includes a plurality of first electrodes arranged in a first direction and a plurality of second electrodes arranged in a second direction that crosses the first direction; and
a second sensing group that includes a central electrode and a plurality of peripheral electrodes disposed in a plurality of openings formed in some of the plurality of first electrodes,
wherein at least one first electrode of the plurality of first electrodes or at least one second electrode of the plurality of second electrodes is interposed between the central electrode and each of the plurality of peripheral electrodes,
wherein coordinates of an external input are sensed by the first sensing group, and a gesture is sensed by the second sensing group.

14. An electronic device, comprising:
a plurality of first electrodes arranged in a first direction;
a plurality of second electrodes arranged in a second direction that crosses the first direction;
a central pattern that extends in the second direction;
a first peripheral pattern that extends in the second direction;
a second peripheral pattern that extends in the second direction;
a third peripheral pattern that extends in the second direction; and
a fourth peripheral pattern that extends in the second direction,
wherein the plurality of first electrodes include:
a first-first electrode that includes a first opening formed in the first-first electrode,
a first-second electrode that includes a second opening formed in the first-second electrode, and
a first-third electrode that includes a third opening, a fourth opening, and a fifth opening spaced apart from each other in the second direction, and
wherein
the first peripheral pattern is disposed in the first opening,
the second peripheral pattern is disposed in the second opening,
the third peripheral pattern is disposed in the third opening,
the central pattern is disposed in the fourth opening, and
the fourth peripheral pattern is disposed in the fifth opening.

15. The electronic device of claim 14,
wherein the first-first electrode, the first-third electrode, and the first-second electrode are arranged in the first direction, and
wherein the plurality of first electrodes further includes:
a first-fourth electrode interposed between the first-first electrode and the first-third electrode; and
a first-fifth electrode interposed between the first-third electrode and the first-second electrode.

16. The electronic device of claim 15, further comprising:
a central trace line electrically connected to the central pattern,
wherein a line opening is formed in one of the first-fourth electrode or the first-fifth electrode, and
wherein the central trace line is disposed in the line opening.

17. The electronic device of claim 14, wherein a first length in the second direction of the central pattern is substantially equal to a second length in the second direction of the first peripheral pattern and a third length in the second direction of the second peripheral pattern.

18. The electronic device of claim 14, further comprising:
a plurality of first trace lines electrically connected to the plurality of first electrodes, respectively;
a plurality of second trace lines electrically connected to the plurality of second electrodes, respectively;
a central trace line electrically connected to the central pattern;
a first peripheral trace line electrically connected to the first peripheral pattern;
a second peripheral trace line electrically connected to the second peripheral pattern;
a third peripheral trace line electrically connected to the third peripheral pattern; and
a fourth peripheral trace line electrically connected to the fourth peripheral pattern, wherein some first trace lines of the plurality of first trace lines are interposed between the third peripheral trace line and the central trace line, wherein other first trace lines of the plurality of first trace lines and some second trace lines of the plurality of second trace lines are interposed between the central trace line and the second peripheral trace line, wherein other second trace lines of the plurality of second trace lines are interposed between the second peripheral trace line and the fourth peripheral trace line, and wherein still other first trace lines of the plurality of first trace lines are interposed between the first peripheral trace line and the third peripheral trace line.

19. The electronic device of claim 18, further comprising:

a plurality of pads connected to the plurality of first trace lines, the plurality of second trace lines, the central trace line, the first peripheral trace line, the second peripheral trace line, the third peripheral trace line, and the fourth peripheral trace line; and a connection trace portion disposed between the fourth peripheral pattern and the fourth peripheral trace line, wherein a plurality of the fourth peripheral patterns is provided, wherein the plurality of fourth peripheral patterns are electrically connected to each other by the connection trace portion, and, wherein the plurality of fourth peripheral patterns are spaced apart from the plurality of pads with the third peripheral pattern interposed between the fourth peripheral patterns and the plurality of pads.

* * * * *